US005604546A

United States Patent [19]

Iwata

[11] Patent Number: 5,604,546

[45] Date of Patent: Feb. 18, 1997

[54] IMAGE SIGNAL PROCESSING CIRCUIT FOR PERFORMING MOTION ESTIMATION

[75] Inventor: Eiji Iwata, Chiba, Japan

[73] Assignee: Sony Corporation, Japan

[21] Appl. No.: 324,713

[22] Filed: Oct. 18, 1994

[30] Foreign Application Priority Data

Oct. 20, 1993 [JP] Japan .................................. 5-262272

[51] Int. Cl.[6] ................................ H04N 7/30; H04N 7/32

[52] U.S. Cl. ........................... 348/699; 348/413; 348/416

[58] Field of Search .................................... 348/412, 413, 348/699, 416, 700, 390; H04N 7/30, 7/32

[56] References Cited

U.S. PATENT DOCUMENTS

| | | | |
|---|---|---|---|
| 4,722,003 | 1/1988 | Kondo | 348/421 |
| 4,729,021 | 3/1988 | Kondo | 348/421 |
| 4,845,560 | 7/1989 | Kondo et al. | 348/416 |
| 4,897,720 | 1/1990 | Wu et al. | 348/412 |
| 4,937,666 | 6/1990 | Yang | 348/413 |
| 5,023,710 | 6/1991 | Kondo et al. | 348/421 |
| 5,083,202 | 1/1992 | Parke et al. | 348/416 |
| 5,173,771 | 12/1992 | Kitazato | 348/416 |
| 5,235,536 | 8/1993 | Matsubishi | 364/736 |
| 5,400,087 | 3/1995 | Uramoto et al. | 348/699 |

FOREIGN PATENT DOCUMENTS

| | | | |
|---|---|---|---|
| 0488795 | 6/1992 | European Pat. Off. | G06F 15/70 |
| 0497586 | 8/1992 | European Pat. Off. | G06F 15/70 |
| 0508706 | 10/1992 | European Pat. Off. | H04N 5/14 |
| 2257326 | 1/1993 | United Kingdom | H04N 5/14 |

OTHER PUBLICATIONS

Komarek et al, "Array Architectures for Block Matching Algorithms", IEEE Trans. on Cir. & Sys., vol. 36, No. 10, Oct. 1989, pp. 1301–1308.

Komarek et al, "VLSI Architectures for Block Matching Algorithms", IEEE 1989, pp. 2457–2460.

De Vos et al, "VLSI Architectures for the Full–Search Block Matching Algorithm", IEEE 1989, pp. 1687–1690.

De Vos et al, "Parameterizable VLSI Architectures for the Full–Search Block Matching Algorithm", IEEE Trans. on Cir. & Sys., 1989, pp. 1309–1316.

Hsieh et al, "VLSI Architecture for Block–Matching Motion Estimation Algorithm", IEEE Trans. on Cir. & Sys. for Video Technology, Jun. 1992, pp. 169–175.

Wu et al, "A VLSI Motion Estimation for Video Image Compression", IEEE, 1993, pp. 837–846.

Chan et al, "Motion Estimation Architecture for Video Compression", IEEE Trans. on Consumer Electronics, vol. 39, No. 3, Aug. 1993, pp. 292–297.

*Primary Examiner*—Thai Q. Tran
*Assistant Examiner*—Vu Le
*Attorney, Agent, or Firm*—Ronald P. Kananen

[57] ABSTRACT

An image data processing circuit for detection of a motion vector by dividing one frame unit of an image signal into a plurality of blocks, each consisting of a predetermined number of pixel data, and performing a search over all frames of the image signal by a block-matching method, as a block size of a reference block of a current frame of the image signal M×N pixels, the number of candidate blocks of the previous frame of the image signal being M×N. The processing circuit performs processing for detection of motion vectors able to simultaneously obtain three types of motion vectors: the motion vector at the even number field, the motion vector at the odd number field, and the motion vector at the frame.

15 Claims, 25 Drawing Sheets

FIG. 4

PIXEL DATA r AT REFERENCE BLOCK Bp0 | PIXEL DATA r AT REFERENCE BLOCK Bp1

| | ra | rb | rc | rd | re | rf | rg | rh | ri | rj | rk | rl | ra′ | rb′ | rc′ | rd′ | re′ | rf′ | rg′ | rh′ | ri′ | rj′ | rk′ | rl′ | | | | | | | | |
|---|---|---|---|---|---|---|---|---|---|---|---|---|---|---|---|---|---|---|---|---|---|---|---|---|---|---|---|---|---|---|---|---|
| PE (21) | $C_0$ | $C_1$ | $C_2$ | $C_3$ | $C_7$ | $C_8$ | $C_9$ | $C_{10}$ | $C_{14}$ | $C_{15}$ | $C_{16}$ | $C_{17}$ | $C_{21}$ | $C_{22}$ | $C_{23}$ | $C_{24}$ | $C_{28}$ | $C_{29}$ | $C_{30}$ | $C_{31}$ | $C_{35}$ | $C_{36}$ | $C_{37}$ | $C_{38}$ | $C_{42}$ | $C_{43}$ | $C_{44}$ | $C_{45}$ | $C_{49}$ | $C_{50}$ | $C_{51}$ | $C_{52}$ |
| PE (20) | $C_1$ | $C_2$ | $C_3$ | $C_4$ | $C_8$ | $C_9$ | $C_{10}$ | $C_{11}$ | $C_{15}$ | $C_{16}$ | $C_{17}$ | $C_{18}$ | $C_{22}$ | $C_{23}$ | $C_{24}$ | $C_{25}$ | $C_{29}$ | $C_{30}$ | $C_{31}$ | $C_{32}$ | $C_{36}$ | $C_{37}$ | $C_{38}$ | $C_{39}$ | $C_{43}$ | $C_{44}$ | $C_{45}$ | $C_{46}$ | $C_{50}$ | $C_{51}$ | $C_{52}$ | $C_{53}$ |
| PE (19) | $C_2$ | $C_3$ | $C_4$ | $C_5$ | $C_9$ | $C_{10}$ | $C_{11}$ | $C_{12}$ | $C_{16}$ | $C_{17}$ | $C_{18}$ | $C_{19}$ | $C_{23}$ | $C_{24}$ | $C_{25}$ | $C_{26}$ | $C_{30}$ | $C_{31}$ | $C_{32}$ | $C_{33}$ | $C_{37}$ | $C_{38}$ | $C_{39}$ | $C_{40}$ | $C_{44}$ | $C_{45}$ | $C_{46}$ | $C_{47}$ | $C_{51}$ | $C_{52}$ | $C_{53}$ | $C_{54}$ |
| PE (18) | $C_3$ | $C_4$ | $C_5$ | $C_6$ | $C_{10}$ | $C_{11}$ | $C_{12}$ | $C_{13}$ | $C_{17}$ | $C_{18}$ | $C_{19}$ | $C_{20}$ | $C_{24}$ | $C_{25}$ | $C_{26}$ | $C_{27}$ | $C_{31}$ | $C_{32}$ | $C_{33}$ | $C_{34}$ | $C_{38}$ | $C_{39}$ | $C_{40}$ | $C_{41}$ | $C_{45}$ | $C_{46}$ | $C_{47}$ | $C_{48}$ | $C_{52}$ | $C_{53}$ | $C_{54}$ | $C_{55}$ |
| PE (17) | $C_7$ | $C_8$ | $C_9$ | $C_{10}$ | $C_{14}$ | $C_{15}$ | $C_{16}$ | $C_{17}$ | $C_{21}$ | $C_{22}$ | $C_{23}$ | $C_{24}$ | $C_{28}$ | $C_{29}$ | $C_{30}$ | $C_{31}$ | $C_{35}$ | $C_{36}$ | $C_{37}$ | $C_{38}$ | $C_{42}$ | $C_{43}$ | $C_{44}$ | $C_{45}$ | $C_{49}$ | $C_{50}$ | $C_{51}$ | $C_{52}$ | $C_{56}$ | $C_{57}$ | $C_{58}$ | $C_{59}$ |
| PE (16) | $C_8$ | $C_9$ | $C_{10}$ | $C_{11}$ | $C_{15}$ | $C_{16}$ | $C_{17}$ | $C_{18}$ | $C_{22}$ | $C_{23}$ | $C_{24}$ | $C_{25}$ | $C_{29}$ | $C_{30}$ | $C_{31}$ | $C_{32}$ | $C_{36}$ | $C_{37}$ | $C_{38}$ | $C_{39}$ | $C_{43}$ | $C_{44}$ | $C_{45}$ | $C_{46}$ | $C_{50}$ | $C_{51}$ | $C_{52}$ | $C_{53}$ | $C_{57}$ | $C_{58}$ | $C_{59}$ | $C_{60}$ |
| PE (15) | $C_9$ | $C_{10}$ | $C_{11}$ | $C_{12}$ | $C_{16}$ | $C_{17}$ | $C_{18}$ | $C_{19}$ | $C_{23}$ | $C_{24}$ | $C_{25}$ | $C_{21}$ | $C_{30}$ | $C_{31}$ | $C_{32}$ | $C_{33}$ | $C_{37}$ | $C_{38}$ | $C_{39}$ | $C_{40}$ | $C_{44}$ | $C_{45}$ | $C_{46}$ | $C_{47}$ | $C_{51}$ | $C_{52}$ | $C_{53}$ | $C_{54}$ | $C_{58}$ | $C_{59}$ | $C_{60}$ | $C_{61}$ |
| PE (14) | $C_{10}$ | $C_{11}$ | $C_{12}$ | $C_{13}$ | $C_{17}$ | $C_{18}$ | $C_{19}$ | $C_{20}$ | $C_{24}$ | $C_{25}$ | $C_{26}$ | $C_{27}$ | $C_{31}$ | $C_{32}$ | $C_{33}$ | $C_{34}$ | $C_{38}$ | $C_{39}$ | $C_{40}$ | $C_{41}$ | $C_{45}$ | $C_{46}$ | $C_{47}$ | $C_{48}$ | $C_{52}$ | $C_{53}$ | $C_{54}$ | $C_{55}$ | $C_{59}$ | $C_{60}$ | $C_{61}$ | $C_{62}$ |
| PE (13) | $C_{14}$ | $C_{15}$ | $C_{16}$ | $C_{17}$ | $C_{21}$ | $C_{22}$ | $C_{23}$ | $C_{24}$ | $C_{28}$ | $C_{29}$ | $C_{30}$ | $C_{31}$ | $C_{35}$ | $C_{36}$ | $C_{37}$ | $C_{38}$ | $C_{42}$ | $C_{43}$ | $C_{44}$ | $C_{45}$ | $C_{49}$ | $C_{50}$ | $C_{51}$ | $C_{52}$ | $C_{56}$ | $C_{57}$ | $C_{58}$ | $C_{59}$ | $C_{63}$ | $C_{64}$ | $C_{65}$ | $C_{66}$ |
| PE (12) | $C_{15}$ | $C_{16}$ | $C_{17}$ | $C_{18}$ | $C_{22}$ | $C_{23}$ | $C_{24}$ | $C_{25}$ | $C_{29}$ | $C_{30}$ | $C_{31}$ | $C_{32}$ | $C_{36}$ | $C_{37}$ | $C_{38}$ | $C_{39}$ | $C_{43}$ | $C_{44}$ | $C_{45}$ | $C_{46}$ | $C_{50}$ | $C_{51}$ | $C_{52}$ | $C_{53}$ | $C_{57}$ | $C_{58}$ | $C_{59}$ | $C_{60}$ | $C_{64}$ | $C_{65}$ | $C_{66}$ | $C_{67}$ |
| PE (11) | $C_{16}$ | $C_{17}$ | $C_{18}$ | $C_{19}$ | $C_{23}$ | $C_{24}$ | $C_{25}$ | $C_{26}$ | $C_{30}$ | $C_{31}$ | $C_{32}$ | $C_{33}$ | $C_{37}$ | $C_{38}$ | $C_{39}$ | $C_{40}$ | $C_{44}$ | $C_{45}$ | $C_{46}$ | $C_{47}$ | $C_{51}$ | $C_{52}$ | $C_{53}$ | $C_{54}$ | $C_{58}$ | $C_{59}$ | $C_{60}$ | $C_{61}$ | $C_{65}$ | $C_{66}$ | $C_{67}$ | $C_{68}$ |
| PE (10) | $C_{17}$ | $C_{18}$ | $C_{19}$ | $C_{20}$ | $C_{24}$ | $C_{25}$ | $C_{26}$ | $C_{27}$ | $C_{31}$ | $C_{32}$ | $C_{33}$ | $C_{34}$ | $C_{38}$ | $C_{39}$ | $C_{40}$ | $C_{41}$ | $C_{45}$ | $C_{46}$ | $C_{47}$ | $C_{48}$ | $C_{52}$ | $C_{53}$ | $C_{54}$ | $C_{55}$ | $C_{59}$ | $C_{60}$ | $C_{61}$ | $C_{62}$ | $C_{66}$ | $C_{67}$ | $C_{68}$ | $C_{69}$ |
| TIME → | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |

→ OUTPUT DATA D (i, j) OF SUM OF ALL ABSOLUTE DIFERENCES AT REFERENCE BLOCK Bp0 (from time 12)

→ OUTPUT DATA D′ (i, j) OF SUM OF ALL ABSOLUTE DIFERENCES AT REFERENCE BLOCK Bp1 (from time 24)

|  | Bp0 | | | Bp1 | | |
|---|---|---|---|---|---|---|
| Fp | ra | re | ri | ra' | re' | ri' |
|  | rb | rf | rj | rb' | rf' | rj' |
|  | rc | rg | rk | rc' | rg' | rk' |
|  | rd | rh | rl | rd' | rh' | rl' |

|  | E0 | | | E1 | | | | | |
|---|---|---|---|---|---|---|---|---|---|
| Fb | $C_0$ | $C_7$ | $C_{14}$ | $C_{21}$ | $C_{28}$ | $C_{35}$ | $C_{42}$ | $C_{49}$ | $C_{56}$ |
|  | $C_1$ | $C_8$ | $C_{15}$ | $C_{22}$ | $C_{29}$ | $C_{36}$ | $C_{43}$ | $C_{50}$ | $C_{57}$ |
|  | $C_2$ | $C_9$ | $C_{16}$ | $C_{23}$ | $C_{30}$ | $C_{37}$ | $C_{44}$ | $C_{51}$ | $C_{58}$ |
|  | $C_3$ | $C_{10}$ | $C_{17}$ | $C_{24}$ | $C_{31}$ | $C_{38}$ | $C_{45}$ | $C_{52}$ | $C_{59}$ |
|  | $C_4$ | $C_{11}$ | $C_{18}$ | $C_{25}$ | $C_{32}$ | $C_{39}$ | $C_{46}$ | $C_{53}$ | $C_{60}$ |
|  | $C_5$ | $C_{12}$ | $C_{19}$ | $C_{26}$ | $C_{33}$ | $C_{40}$ | $C_{47}$ | $C_{54}$ | $C_{61}$ |
|  | $C_6$ | $C_{13}$ | $C_{20}$ | $C_{27}$ | $C_{34}$ | $C_{41}$ | $C_{48}$ | $C_{55}$ | $C_{62}$ |

PIXEL DATA r AT INPUT REFERENCE BLOCK Bp0 IN EACH PROCESSOR UNIT (PE (190), PE (191), PE (192) ······ PE (201))

PIXEL DATA r AT INPUT REFERENCE BLOCK Bp2 IN EACH PROCESSOR UNIT (PE (190), PE (191), PE (192) ······ PE (201))

| | ra | rb | rc | rd | re | rf | rg | rh | ri | rj | rk | rl | ra′ | rb′ | rc′ | rd′ | re′ | rf′ | rg′ | rh′ | ri′ | rj′ | rk′ | rl′ | | | | | | | | |
|---|---|---|---|---|---|---|---|---|---|---|---|---|---|---|---|---|---|---|---|---|---|---|---|---|---|---|---|---|---|---|---|---|
| PE (190) | $C_{0}$ | $C_{1}$ | $C_{2}$ | $C_{3}$ | $C_{7}$ | $C_{8}$ | $C_{9}$ | $C_{10}$ | $C_{14}$ | $C_{15}$ | $C_{16}$ | $C_{17}$ | $C_{21}$ | $C_{22}$ | $C_{23}$ | $C_{24}$ | $C_{28}$ | $C_{29}$ | $C_{30}$ | $C_{31}$ | $C_{35}$ | $C_{36}$ | $C_{37}$ | $C_{38}$ | $C_{42}$ | $C_{43}$ | $C_{44}$ | $C_{45}$ | $C_{49}$ | $C_{50}$ | $C_{51}$ | $C_{52}$ |
| PE (192) | | | $C_{2}$ | $C_{3}$ | $C_{4}$ | $C_{5}$ | $C_{9}$ | $C_{10}$ | $C_{11}$ | $C_{12}$ | $C_{16}$ | $C_{17}$ | $C_{18}$ | $C_{19}$ | $C_{23}$ | $C_{24}$ | $C_{25}$ | $C_{26}$ | $C_{30}$ | $C_{31}$ | $C_{32}$ | $C_{33}$ | $C_{37}$ | $C_{38}$ | $C_{39}$ | $C_{40}$ | $C_{44}$ | $C_{45}$ | $C_{46}$ | $C_{47}$ | $C_{51}$ | $C_{52}$ |
| PE (194) | | | | | $C_{7}$ | $C_{8}$ | $C_{9}$ | $C_{10}$ | $C_{14}$ | $C_{15}$ | $C_{16}$ | $C_{17}$ | $C_{21}$ | $C_{22}$ | $C_{23}$ | $C_{24}$ | $C_{28}$ | $C_{29}$ | $C_{30}$ | $C_{31}$ | $C_{35}$ | $C_{36}$ | $C_{37}$ | $C_{38}$ | $C_{42}$ | $C_{43}$ | $C_{44}$ | $C_{45}$ | $C_{49}$ | $C_{50}$ | $C_{51}$ | $C_{52}$ |
| PE (196) | | | | | | | $C_{9}$ | $C_{10}$ | $C_{11}$ | $C_{12}$ | $C_{16}$ | $C_{17}$ | $C_{18}$ | $C_{19}$ | $C_{23}$ | $C_{24}$ | $C_{25}$ | $C_{26}$ | $C_{30}$ | $C_{31}$ | $C_{32}$ | $C_{33}$ | $C_{37}$ | $C_{38}$ | $C_{39}$ | $C_{40}$ | $C_{44}$ | $C_{45}$ | $C_{46}$ | $C_{47}$ | $C_{51}$ | $C_{52}$ |
| PE (198) | | | | | | | | | $C_{14}$ | $C_{15}$ | $C_{16}$ | $C_{17}$ | $C_{21}$ | $C_{22}$ | $C_{23}$ | $C_{24}$ | $C_{28}$ | $C_{29}$ | $C_{30}$ | $C_{31}$ | $C_{35}$ | $C_{36}$ | $C_{37}$ | $C_{38}$ | $C_{42}$ | $C_{43}$ | $C_{44}$ | $C_{45}$ | $C_{49}$ | $C_{50}$ | $C_{51}$ | $C_{52}$ |
| PE (200) | | | | | | | | | | | $C_{16}$ | $C_{17}$ | $C_{18}$ | $C_{19}$ | $C_{23}$ | $C_{24}$ | $C_{25}$ | $C_{26}$ | $C_{30}$ | $C_{31}$ | $C_{32}$ | $C_{33}$ | $C_{37}$ | $C_{38}$ | $C_{39}$ | $C_{40}$ | $C_{44}$ | $C_{45}$ | $C_{46}$ | $C_{47}$ | $C_{51}$ | $C_{52}$ |
| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |

TIME →

→ De (0, 0) OUTPUT

→ De (0, 1) OUTPUT

→ De (0, 2) OUTPUT ······

→ D′ e (0, 0) OUTPUT

→ D′ e (0, 1) OUTPUT

→ D′ e (0, 2) OUTPUT ······

FIG. 10

PIXEL DATA AT INPUT REFERENCE BLOCK Bp0 IN EACH PROCESSOR UNIT: PE (190) → ra, PE (191) → rb, PE (192) → rc, ……, PE (201) → rl

PIXEL DATA AT INPUT REFERENCE BLOCK Bp2 IN EACH PROCESSOR UNIT: PE (190) → ra', PE (191) → rb', PE (192) → rc', ……, PE (201) → rl'

| TIME | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| | ra | rb | rc | rd | re | rf | rg | rh | ri | rj | rk | rl | ra' | rb' | rc' | rd' |
| PE (191) | | $C_{1}$ | $C_{2}$ | $C_{3}$ | $C_{4}$ | $C_{8}$ | $C_{9}$ | $C_{10}$ | $C_{11}$ | $C_{15}$ | $C_{16}$ | $C_{17}$ | $C_{18}$ | $C_{22}$ | $C_{23}$ | $C_{24}$ |
| PE (193) | | | | $C_{3}$ | $C_{4}$ | $C_{5}$ | $C_{6}$ | $C_{10}$ | $C_{11}$ | $C_{12}$ | $C_{13}$ | $C_{17}$ | $C_{18}$ | $C_{19}$ | $C_{20}$ | $C_{24}$ |
| PE (195) | | | | | | $C_{8}$ | $C_{9}$ | $C_{10}$ | $C_{14}$ | $C_{15}$ | $C_{16}$ | $C_{17}$ | $C_{18}$ | $C_{22}$ | $C_{23}$ | $C_{24}$ |
| PE (197) | | | | | | | | $C_{10}$ | $C_{11}$ | $C_{12}$ | $C_{16}$ | $C_{17}$ | $C_{18}$ | $C_{19}$ | $C_{23}$ | $C_{24}$ |
| PE (199) | | | | | | | | | | $C_{15}$ | $C_{16}$ | $C_{17}$ | $C_{18}$ | $C_{22}$ | $C_{23}$ | $C_{24}$ |
| PE (201) | | | | | | | | | | | | $C_{17}$ | $C_{18}$ | $C_{19}$ | $C_{20}$ | $C_{24}$ |

| TIME | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|
| | re' | rf' | rg' | rh' | ri' | rj' | rk' | rl' | | | | | | | | |
| PE (191) | $C_{25}$ | $C_{29}$ | $C_{30}$ | $C_{31}$ | $C_{32}$ | $C_{36}$ | $C_{37}$ | $C_{38}$ | $C_{39}$ | $C_{43}$ | $C_{44}$ | $C_{45}$ | $C_{46}$ | $C_{50}$ | $C_{51}$ | $C_{52}$ |
| PE (193) | $C_{25}$ | $C_{26}$ | $C_{27}$ | $C_{31}$ | $C_{32}$ | $C_{33}$ | $C_{34}$ | $C_{38}$ | $C_{39}$ | $C_{40}$ | $C_{41}$ | $C_{45}$ | $C_{46}$ | $C_{47}$ | $C_{48}$ | $C_{52}$ |
| PE (195) | $C_{28}$ | $C_{29}$ | $C_{30}$ | $C_{31}$ | $C_{35}$ | $C_{36}$ | $C_{37}$ | $C_{38}$ | $C_{42}$ | $C_{43}$ | $C_{44}$ | $C_{45}$ | $C_{49}$ | $C_{50}$ | $C_{51}$ | $C_{52}$ |
| PE (197) | $C_{25}$ | $C_{26}$ | $C_{30}$ | $C_{31}$ | $C_{32}$ | $C_{33}$ | $C_{37}$ | $C_{38}$ | $C_{39}$ | $C_{40}$ | $C_{44}$ | $C_{45}$ | $C_{46}$ | $C_{47}$ | $C_{51}$ | $C_{52}$ |
| PE (199) | $C_{25}$ | $C_{29}$ | $C_{30}$ | $C_{31}$ | $C_{32}$ | $C_{36}$ | $C_{37}$ | $C_{38}$ | $C_{39}$ | $C_{43}$ | $C_{44}$ | $C_{45}$ | $C_{46}$ | $C_{50}$ | $C_{51}$ | $C_{52}$ |
| PE (201) | $C_{25}$ | $C_{26}$ | $C_{27}$ | $C_{31}$ | $C_{32}$ | $C_{33}$ | $C_{34}$ | $C_{38}$ | $C_{39}$ | $C_{40}$ | $C_{41}$ | $C_{45}$ | $C_{46}$ | $C_{47}$ | $C_{48}$ | $C_{52}$ |

→ Do (0, 0) OUTPUT

→ Do (0, 1) OUTPUT

→ Do (0, 2) OUTPUT ……

→ D'o (0, 0) OUTPUT

→ D'o (0, 1) OUTPUT

→ D'o (0, 2) OUTPUT ……

FIG. 13

PIXEL DATA AT INPUT REFERENCE BLOCK Bp0 IN PE (210) (columns ra–rl, times 0–11)

PIXEL DATA AT INPUT REFERENCE BLOCK Bp1 IN PE (210) (columns ra′–rl′, times 12–23)

| | ra | rb | rc | rd | re | rf | rg | rh | ri | rj | rk | rl | ra′ | rb′ | rc′ | rd′ | re′ | rf′ | rg′ | rh′ | ri′ | rj′ | rk′ | rl′ | | | | | | | | |
|---|---|---|---|---|---|---|---|---|---|---|---|---|---|---|---|---|---|---|---|---|---|---|---|---|---|---|---|---|---|---|---|---|
| PE (210) | $C_{0}$ | $C_{1}$ | $C_{2}$ | $C_{3}$ | $C_{7}$ | $C_{8}$ | $C_{9}$ | $C_{10}$ | $C_{14}$ | $C_{15}$ | $C_{16}$ | $C_{17}$ | $C_{21}$ | $C_{22}$ | $C_{23}$ | $C_{24}$ | $C_{28}$ | $C_{29}$ | $C_{30}$ | $C_{31}$ | $C_{35}$ | $C_{36}$ | $C_{37}$ | $C_{38}$ | $C_{42}$ | $C_{43}$ | $C_{44}$ | $C_{45}$ | $C_{49}$ | $C_{50}$ | $C_{51}$ | $C_{52}$ |
| PE (211) | | $C_{1}$ | $C_{2}$ | $C_{3}$ | $C_{4}$ | $C_{8}$ | $C_{9}$ | $C_{10}$ | $C_{11}$ | $C_{15}$ | $C_{16}$ | $C_{17}$ | $C_{18}$ | $C_{22}$ | $C_{23}$ | $C_{24}$ | $C_{25}$ | $C_{29}$ | $C_{30}$ | $C_{31}$ | $C_{32}$ | $C_{36}$ | $C_{37}$ | $C_{38}$ | $C_{39}$ | $C_{43}$ | $C_{44}$ | $C_{45}$ | $C_{46}$ | $C_{50}$ | $C_{51}$ | $C_{52}$ |
| PE (212) | | | $C_{2}$ | $C_{3}$ | $C_{4}$ | $C_{5}$ | $C_{9}$ | $C_{10}$ | $C_{11}$ | $C_{12}$ | $C_{16}$ | $C_{17}$ | $C_{18}$ | $C_{19}$ | $C_{23}$ | $C_{24}$ | $C_{25}$ | $C_{26}$ | $C_{30}$ | $C_{31}$ | $C_{32}$ | $C_{33}$ | $C_{37}$ | $C_{38}$ | $C_{39}$ | $C_{40}$ | $C_{44}$ | $C_{45}$ | $C_{46}$ | $C_{47}$ | $C_{51}$ | $C_{52}$ |
| PE (213) | | | | $C_{3}$ | $C_{4}$ | $C_{5}$ | $C_{6}$ | $C_{10}$ | $C_{11}$ | $C_{12}$ | $C_{13}$ | $C_{17}$ | $C_{18}$ | $C_{19}$ | $C_{20}$ | $C_{24}$ | $C_{25}$ | $C_{26}$ | $C_{27}$ | $C_{31}$ | $C_{32}$ | $C_{33}$ | $C_{34}$ | $C_{38}$ | $C_{39}$ | $C_{40}$ | $C_{41}$ | $C_{45}$ | $C_{46}$ | $C_{47}$ | $C_{48}$ | $C_{52}$ |
| PE (214) | | | | | $C_{7}$ | $C_{8}$ | $C_{9}$ | $C_{10}$ | $C_{14}$ | $C_{15}$ | $C_{16}$ | $C_{17}$ | $C_{21}$ | $C_{22}$ | $C_{23}$ | $C_{24}$ | $C_{28}$ | $C_{29}$ | $C_{30}$ | $C_{31}$ | $C_{35}$ | $C_{36}$ | $C_{37}$ | $C_{38}$ | $C_{42}$ | $C_{43}$ | $C_{44}$ | $C_{45}$ | $C_{49}$ | $C_{50}$ | $C_{51}$ | $C_{52}$ |
| PE (215) | | | | | | $C_{8}$ | $C_{9}$ | $C_{10}$ | $C_{11}$ | $C_{15}$ | $C_{16}$ | $C_{17}$ | $C_{18}$ | $C_{22}$ | $C_{23}$ | $C_{24}$ | $C_{25}$ | $C_{29}$ | $C_{30}$ | $C_{31}$ | $C_{32}$ | $C_{36}$ | $C_{37}$ | $C_{38}$ | $C_{39}$ | $C_{43}$ | $C_{44}$ | $C_{45}$ | $C_{46}$ | $C_{50}$ | $C_{51}$ | $C_{52}$ |
| PE (216) | | | | | | | $C_{9}$ | $C_{10}$ | $C_{11}$ | $C_{12}$ | $C_{16}$ | $C_{17}$ | $C_{18}$ | $C_{19}$ | $C_{23}$ | $C_{24}$ | $C_{25}$ | $C_{26}$ | $C_{30}$ | $C_{31}$ | $C_{32}$ | $C_{33}$ | $C_{37}$ | $C_{38}$ | $C_{39}$ | $C_{40}$ | $C_{44}$ | $C_{45}$ | $C_{46}$ | $C_{47}$ | $C_{51}$ | $C_{52}$ |
| PE (217) | | | | | | | | $C_{10}$ | $C_{11}$ | $C_{12}$ | $C_{13}$ | $C_{17}$ | $C_{18}$ | $C_{19}$ | $C_{20}$ | $C_{24}$ | $C_{25}$ | $C_{26}$ | $C_{27}$ | $C_{31}$ | $C_{32}$ | $C_{33}$ | $C_{34}$ | $C_{38}$ | $C_{39}$ | $C_{40}$ | $C_{41}$ | $C_{45}$ | $C_{46}$ | $C_{47}$ | $C_{48}$ | $C_{52}$ |
| PE (218) | | | | | | | | | $C_{14}$ | $C_{15}$ | $C_{16}$ | $C_{17}$ | $C_{21}$ | $C_{22}$ | $C_{23}$ | $C_{24}$ | $C_{28}$ | $C_{29}$ | $C_{30}$ | $C_{31}$ | $C_{35}$ | $C_{36}$ | $C_{37}$ | $C_{38}$ | $C_{42}$ | $C_{43}$ | $C_{44}$ | $C_{45}$ | $C_{49}$ | $C_{50}$ | $C_{51}$ | $C_{52}$ |
| PE (219) | | | | | | | | | | $C_{15}$ | $C_{16}$ | $C_{17}$ | $C_{18}$ | $C_{22}$ | $C_{23}$ | $C_{24}$ | $C_{25}$ | $C_{29}$ | $C_{30}$ | $C_{31}$ | $C_{32}$ | $C_{36}$ | $C_{37}$ | $C_{38}$ | $C_{39}$ | $C_{43}$ | $C_{44}$ | $C_{45}$ | $C_{46}$ | $C_{50}$ | $C_{51}$ | $C_{52}$ |
| PE (220) | | | | | | | | | | | $C_{16}$ | $C_{17}$ | $C_{18}$ | $C_{19}$ | $C_{23}$ | $C_{24}$ | $C_{25}$ | $C_{26}$ | $C_{30}$ | $C_{31}$ | $C_{32}$ | $C_{33}$ | $C_{37}$ | $C_{38}$ | $C_{39}$ | $C_{40}$ | $C_{44}$ | $C_{45}$ | $C_{46}$ | $C_{47}$ | $C_{51}$ | $C_{52}$ |
| PE (221) | | | | | | | | | | | | $C_{17}$ | $C_{18}$ | $C_{19}$ | $C_{20}$ | $C_{24}$ | $C_{25}$ | $C_{26}$ | $C_{27}$ | $C_{31}$ | $C_{32}$ | $C_{33}$ | $C_{34}$ | $C_{38}$ | $C_{39}$ | $C_{40}$ | $C_{41}$ | $C_{45}$ | $C_{46}$ | $C_{47}$ | $C_{48}$ | $C_{52}$ |
| TIME → | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |

→ De (0, 0) OUTPUT (PE (210))

→ Do (0, 0) OUTPUT (PE (210))

→ De (0, 0) OUTPUT (PE (211))

→ Do (0, 1) OUTPUT (PE (211)) ······

→ D′ e (0, 0) OUTPUT (PE (210))

→ D′ o (0, 0) OUTPUT (PE (210))

→ D′ e (0, 1) OUTPUT (PE (211))

→ D′ o (0, 1) OUTPUT (PE211)) ······

MACRO-BLOCK

IMAGE SIGNAL PROCESSING CIRCUIT FOR PERFORMING MOTION ESTIMATION

BACKGROUND OF THE INVENTION

1. Field of the Invention

The present invention relates to an image signal processing circuit advantageously employed for detection of a motion vector employed for image compression and encoding in digital image processing. More particularly, the invention relates to an image signal processing circuit for detecting a motion vector by carrying out a full search of the image data by a block-matching method.

The present invention is an improvement of the invention of the pending U.S. patent application Ser. No. 08/140,318 of the same assignee of this application.

2. Description of the Related Art

Among the methods in general commercial use for the detection of motion vectors as used in image compression and encoding in processing digital image signals, there is a block-matching method and a gradient method.

An explanation will be made here of the block-matching method. The block-matching method is extensively used for motion compensation prediction in image compression and encoding.

In the block-matching method, picture frame data or field data are divided into smaller blocks. The size of each block used at this time is in general 8×8 pixels or 16×16 pixels. In this method, processing for detection of a motion vector means, basically, detecting from which region of a previous frame a certain block (called a reference block) of a current frame has moved. Specifically, detection of a motion vector involves processing to detect the block bearing the strongest resemblance to a reference block Bp of a current frame Fp from a group of candidate blocks Bb in a search range E of the previous frame Fb and detecting the shift in position between the detected candidate block Bb and the reference block Bp as the motion vector, as shown for example, in FIG. 5.

Here, a reference block is the block subjected to the motion vector detection processing at any one point of time in the latest frame of a color motion picture (current frame), while a candidate block is the block focused on in the calculation of the difference from the frame just before the current frame (previous frame).

The block bearing the strongest resemblance to the reference block Bp is determined as follows in the processing for detection of a motion vector.

As a first step, the difference is taken between each pixel data c̲ of a given candidate block Bb and the corresponding pixel data r̲ of the reference block Bp and an evaluation value is found represented by the differences. For example, a sum of the absolute values of the differences (hereinafter referred to as the "absolute differences") or a sum of the square value of the differences (hereinafter after referred to as the "squared differences").

As a second step, the operation of the first step is performed for each other of the other candidate blocks Bb within the search range E and the block which gives the smallest sum of the absolute differences is found. The candidate block Bb giving the smallest the sum of the absolute differences or sum of the squared differences is adopted as the block bearing the strongest resemblance to the reference block Bp.

Specifically, if the block size of the reference block Bp is M×N pixels and the number of the candidate blocks Bb is K×L, the above-described processing detect of a movement vector may be represented by the following formulas (1) and (2):

$$D(i,j) = \sum_{m=0}^{M-1} \sum_{n=0}^{N-1} |r_{m,n} - c_{m+i,n+j}| \quad (1)$$
$$0 \leqq i < K,\ 0 \leqq j < L$$

$$MV(x,y) = minD(i,j) \quad (2)$$

Note that the sum of the absolute differences D(i,j) is found in formula (1) and formula (2), not the sum of squared differences. Further, the r̲ in formula (1) represents the pixel data of the reference block Bp of the current frame, while the c̲ in formula (1) represents the pixel data of one of the candidate blocks of the previous frame. Further, the (x,y) in formula (2) means the pixel position (i,j) which gives the least sum of the absolute differences (minD(i,j)). The (x,y) in formula (2) represents the movement vector MV(x,y).

In view of the above, in the case of a block size of a reference block Bp of 4×4 pixels and the number of the candidate block Bp of 7×7, in the above-described example of FIG. 5 in which the sum of the absolute differences D(5,3) becomes the smallest, the movement vector MV is given as (5,3):MV(5,3).

Next, an explanation will be made of the circuit configuration for processing to detect of a motion vector in frame units (hereinafter referred to as "processing for detection of a motion vector of a frame"). First, to help explain the circuit configuration, an explanation will be made of an example of the processing for detection of a motion vector. The circuit configuration and control system will be explained with reference to this example.

Here, as one example, an explanation will be made with reference to FIG. 6 of processing for detection of a motion vector in the case where a block size of the reference block Bp has 3×4 pixels and the number of candidate blocks Bb is 3×4. Note that in FIG. 6, the pixel data r̲ of a reference block Bp of the current frame Fp have the English lower case letters a, b, c, . . . affixed as subscripts ($r_a$, $r_b$, $r_c$, . . . ). Further, the pixel data c̲ of the previous frame Fb have the numerals 0, 1, 2, . . . affixed as subscripts ($c_0$, $c_1$, $c_2$, . . . ). Below, an explanation will be made of the routine for the processing for detection of a motion vector of a frame with reference to FIG. 6.

As a first step of the processing, the calculations of the following formulas (3) to (14) are performed on the pixel data c̲ ($c_0$ to $c_{34}$) of all the candidate blocks Bb0 (of which there are 12) in the search range E0 for a reference block Bp0 based on the above-mentioned formula (1) to obtain the sum of the absolute differences, D(i,j), where $o \leqq i \leqq 2$, $0 \leqq j \leqq 3$.

$$D(0,0)=|r_a-c_0|+|r_b-c_1|+|r_c-c_2|+|r_d-c_3|+|r_e-c_7|+ - - - +|r_l-c_{17}| \quad (3)$$

$$D(0,1)=|r_a-c_1|+|r_b-c_2|+|r_c-c_3|+|r_d-c_4|+|r_e-c_8|+ - - - +|r_l-c_{18}| \quad (4)$$

$$D(0,2)=|r_a-c_2|+|r_b-c_3|+|r_c-c_4|+|r_d-c_5|+|r_e-c_9|+ - - - +|r_l-c_{19}| \quad (5)$$

$$D(0,3)=|r_a-c_3|+|r_b-c_4|+|r_c-c_5|+|r_d-c_6|+|r_e-c_{10}|+ - - - +|r_l-c_{20}| \quad (6)$$

$$D(1,0)=|r_a-c_7|+|r_b-c_8|+|r_c-c_9|+|r_d-c_{10}|+|r_e-c_{14}|+ - - - +|r_l-c_{24}| \quad (7)$$

$$D(1,1)=|r_a-c_8|+|r_b-c_9|+|r_c-c_{10}|+|r_d-c_{11}|+|r_e-c_{15}|+ - - - +|r_l-c_{25}| \quad (8)$$

$$D(1,2)=|r_a-c_9|+|r_b-c_{10}|+|r_c-c_{11}|+|r_d-c_{12}|+|r_e-c_{16}|+ - - - +|r_l-c_{26}| \quad (9)$$

$$D(1,3)=|r_a-c_{10}|+|r_b-c_{11}|+|r_c-c_{12}|+|r_d-c_{13}|+|r_e-c_{17}|+ - - - +|r_f-c_{27}| \quad (10)$$

$$D(2,0)=|r_a-c_{14}|+|r_b-c_{15}|+|r_c-c_{16}|+|r_d-c_{17}|+|r_e-c_{21}|+ - - - +|r_f-c_{31}| \quad (11)$$

$$D(2,1)=|r_a-c_{15}|+|r_b-c_{16}|+|r_c-c_{17}|+|r_d-c_{18}|+|r_e-c_{22}|+ - - - +|r_f-c_{32}| \quad (12)$$

$$D(2,2)=|r_a-c_{16}|+|r_b-c_{17}|+|r_c-c_{18}|+|r_d-c_{19}|+|r_e-c_{23}|+ - - - +|r_f-c_{33}| \quad (13)$$

$$D(2,3)=|r_a-c_{17}|+|r_b-c_{18}|+|r_c-c_{19}|+|r_d-c_{20}|+|r_e-c_{24}|+ - - - +|r_f-c_{34}| \quad (14)$$

A detailed description of the sum of the squared differences will be omitted since it is sufficient if the terms of the absolute differences are made $(r-c)^2$.

Next, as the second step of the processing, the sum of the absolute differences minD(i,j) giving the smallest value is found from among all the sums of absolute differences D(i,j) ($0 \leqq i<2$, $0 \leqq j<3$) found in the above-mentioned first step of the processing based on the above-mentioned formula (2) so as to obtain the motion vector MV(x,y).

As the third step of the processing, calculations are performed based on formula (1), in the same way as in the first step of the processing, for the pixel data $r_{a'}$ to $r_{f'}$ of the reference block Bp1 adjoining the reference block Bp0 and the pixel data $c_{21}$ to $c_{55}$ of all the candidate blocks Bb1 (of which there are 12 in the embodiment) in the search range E1 of the reference block Bp1 so as to find the sums D'(i,j) of absolute differences ($0 \leqq i<2$, $0 \leqq j<3$).

Then, as a fourth step of the processing, the sum of the absolute differences minD'(i,j) giving the smallest value is found from among all the sums of the absolute differences D'(i,j) ($0 \leqq i<2$, $0 \leqq j<3$) found in the above-mentioned third step of the processing based on the above-mentioned formula (2) so as to obtain the motion vector MV(x,y).

Finally, as a fifth step of the processing, the above procedure is repeated for all the other reference blocks Bp of the current frame Fp in the same way to find the motion vector MV(x,y).

The processing for detection of a motion vector explained above is realized by the circuit configuration shown in FIG. 1, FIG. 2, and FIG. 3.

Here, FIG. 1 shows the overall configuration of a motion vector detection circuit, that is, an image signal processing circuit for detection of a motion vector. In FIG. 1, the image signal processing circuit is comprised of a plurality of processing units (PE) 10 to 21, a plurality of pixel data storage registers (REG) 22 to 38, and a plurality of multiplexer-equipped pixel data storage registers (M&R) 39 to 44 connected with each other.

That is, in FIG. 1, the pixel data r̲ of a reference block Bp are supplied to a terminal 1 and are then sent to the cascade-connected processing units 10 to 21. Further, the pixel data c̲ of the candidate blocks Bb of the upper half of the search range E, for example, are supplied to the terminal 2 and sent to the input terminal of the first-stage register 22 of the cascade-connected pixel data storage registers 22 to 25 to be successively stored in the pixel data storage registers 22 to 25.

The outputs of the pixel data storage registers 22 to 25 are also supplied to the corresponding processing units 10 to 13 among the above-mentioned processing units 10 to 21. The output of the processing unit 13 among the processing units 10 to 13 is supplied to the input terminal of the first-stage register 30 of the cascade-connected pixel data storage registers 30 to 32 to be successively stored by these pixel data storage registers 30 to 32. The outputs of the pixel data storage registers 30 to 32 are also supplied to the corresponding processing units 15 to 17 among the processing units 10 to 21.

Further, the output of the processing unit 17 among the processing units 15 to 17 is supplied to the input terminal of the first-stage register 33 of the cascade-connected pixel data storage registers 33 to 35 to be successively stored by these pixel data storage registers 33 to 35. The outputs of these pixel data storage registers 33 to 35 are supplied to the corresponding processing units 19 to 21 among the above-mentioned processing units 10 to 12.

Further, the pixel data c̲ of the candidate blocks Bb of the lower half of the search range E, for example, are supplied to the terminal 3 and sent to the input terminal of the first-stage register 26 of the cascade-connected pixel data storage registers 26 to 29 to be successively stored in the pixel data storage registers 26 to 29. The output of the pixel data storage register 27 among the pixel data storage registers 26 to 29 is also supplied to the pixel data storage register 36, the output of the register 28 is supplied to the other input terminal of the multiplexer-equipped pixel data storage register 39, to the first input terminal of which the output of the register 36 is supplied, and the output of the register 29 is also supplied to the other input terminal of the multiplexer-equipped pixel data storage register 40, to the first input terminal of which the output of the register 39 is supplied.

The output of the multiplexer-equipped pixel data storage register 40 is supplied to the input terminal of the processing unit 10 among the processing units 10 to 21. The output of the processing unit 10 is supplied to the next processing unit 11 and is supplied to the input terminal of the pixel data storage register 37. The output of the register 37 is supplied to the other input terminal of the multiplexer-equipped pixel data storage register 41, to the first input terminal of which the output of the processing unit 11 is supplied, and the output of the register 41 is supplied to the other input terminal of the multiplexer-equipped pixel data storage register 42, to the first input terminal of which the output of the processing unit 12 is supplied. Further, the output of the processing unit 13 is supplied to the pixel data storage register 30 and is supplied to the processing unit 14 as well.

Further, the output of the processing unit 14 is supplied to the next processing unit 15 and is supplied to the input terminal of the pixel data storage register 38. The output of the register 38 is supplied to the other input terminal of the multiplexer-equipped pixel data storage register 43, to the first input terminal of which the output of the processing unit 15 is supplied, and the output of the register 43 is supplied to the other input terminal of the multiplexer-equipped pixel data storage register 44, to the first input terminal of which the output of the processing unit 16 is supplied. Further, the output of the processing unit 17 is supplied to the pixel data storage register 33 and is supplied to the processing unit 18 as well.

Specifically, each of the processing units 10 to 21 shown in FIG. 1 is constructed as shown in FIG. 2. In FIG. 2, outputs of the other processing units or outputs of the pixel data storage registers of FIG. 1 are supplied to a terminal 51, while outputs of the other processing units or outputs of the multiplexer-equipped pixel data storage registers shown in FIG. 1 are supplied to a terminal 55. The input signals supplied to the terminals 51 and 55 are multiplexed by a multiplexer (MPX) 57, then are suitably switched and then supplied to pixel data storage register 58. The output of the pixel data storage register 58 is output at output terminals 52 and 54, while being supplied to an input terminal of an absolute difference processor (|r−c|) 59. The other input terminal of the absolute difference processor 59 is supplied with the pixel data r̲ of the reference block Bp via the terminal 1 of FIG. 1 and a terminal 53. An output of the processor 59 is supplied to an accumulator (ACC) 60, where it is accumulated by the accumulator 60 and then the result output as the sum of the absolute differences D(i,j) at a terminal 56.

On the other hand, each of the multiplexer-equipped pixel data storage registers 39 to 44 shown in FIG. 1 is constructed as shown in FIG. 3. In FIG. 3, an output of the pixel data storage register or the multiplexer-equipped pixel data storage register of the preceding stage shown in FIG. 1 is supplied to a terminal 72, while an output of the associated pixel data storage register or the processing unit shown in FIG. 1 is supplied via a terminal 54 shown in FIG. 2. The input signals supplied to the terminals 72 and 73 are multiplexed by a multiplexer 75 and are suitably switched, then are supplied to a pixel data storage. register 76. An output of the pixel data storage register 76 is supplied to a later stage circuit via a terminal 71.

A control method for realizing the processing for detection of a motion vector using the circuit configuration shown in FIGS. 2 and 3 is hereinafter explained by referring to FIG. 4 showing control timings for motion vector detection.

As shown in FIG. 4, the pixel data r̲ of the reference block Bp are given to all of the processing units each clock cycle. That is, each processing unit performs processing on the same pixel data r̲ of a given reference block Bp during a given clock cycle.

On the other hand, the pixel data c̲ of the candidate blocks Bb are divided into two regions, the upper half and lower half of the search range E, and then successively supplied to the input terminals 2, 3, shown in FIG. 1. Also, the pixel data c̲ of the candidate blocks Bb are supplied at each clock cycle to a later stage pixel data storage register. However, they are transmitted to the pixel data storage register 58 of the processing unit shown in FIG. 2 once every four clock cycles. In this manner, each processing unit performs processing on different pixel data c̲ of the candidate blocks Bb during a given clock cycle, as shown in FIG. 4.

In the above processing circuit, the sums of the absolute differences are all output from the respective processing units every 12 clock cycles (output from the output terminal 56 shown in FIG. 1) as a result of the above-described control. The motion vector MV(x,y) is found by comparing the magnitudes of these sums D(i,j). Note that since the accumulator 60 shown in FIG. 2 immediately starts the accumulation of the sums of the absolute differences D(i,j) for the next reference block Bp during the next clock cycle, it is necessary to store the sums of the absolute differences D(i,j) once in the respective registers before proceeding to comparison as mentioned above.

The above explanation is of the circuit configuration for processing for detection of a motion vector of a frame.

Below, an explanation will be made of a circuit configuration able to handle also processing for detection of a motion vector in units of fields (hereinafter referred to as "processing for detection of a motion vector for a field"). In this processing for detection of a motion vector for a field, three motion vectors, one each for the even number field, odd number field, and frame will be obtained. Here, use will once again be made of the example used for the explanation of the processing for detection of a motion vector of a frame (see FIG. 6).

Here, assume that the pixel data $r_a$ to $r_l$ of the reference block Bp0 are divided into the following two groups corresponding to the even number field and odd number field. That is, for example, they are divided into the group of ($r_a$, $r_c$, $r_e$, $r_g$, $r_i$, $r_k$) for the even number field and the group of ($r_b$, $r_d$, $r_f$, $r_h$, $r_j$, $r_l$) for the odd number field.

Below, an explanation will be made of the routine for the processing for detection of motion vectors for the above fields, with reference to FIG. 6.

First, an explanation will be made of the case of the even number field. In this case, the pixel data r̲ of the even number field of a reference block Bp0 and the pixel data $c_0$ to $c_{34}$ of all the candidate blocks Bb0 (of which there are 12) in the search range E0 for the reference block Bp0 are used to perform the calculation shown in the following formulas (15) to (26) based on formula (1) and thereby find the sum of the absolute differences $D_e$(i,j) at the even number field (0≦i<2, 0≦j<3):

$$D_e(0,0)=|r_a-c_0|+|r_c-c_2|+|r_e-c_7|+|r_g-c_9|+|r_i-c_{14}|+|r_k-c_{16}| \quad (15)$$

$$D_e(0,1)=|r_a-c_1|+|r_c-c_3|+|r_e-c_8|+|r_g-c_{10}|+|r_i-c_{15}|+|r_k-c_{17}| \quad (16)$$

$$D_e(0,2)=|r_a-c_2|+|r_c-c_4|+|r_e-c_9|+|r_g-c_{11}|+|r_i-c_{16}|+|r_k-c_{18}| \quad (17)$$

$$D_e(0,3)=|r_a-c_3|+|r_c-c_5|+|r_e-c_{10}|+|r_g-c_{12}|+|r_i-c_{17}|+|r_k-c_{19}| \quad (18)$$

$$D_e(1,0)=|r_a-c_7|+|r_c-c_9|+|r_e-c_{14}|+|r_g-c_{16}|+|r_i-c_{21}|+|r_k-c_{23}| \quad (19)$$

$$D_e(1,1)=|r_a-c_8|+|r_c-c_{10}|+|r_e-c_{15}|+|r_g-c_{17}|+|r_i-c_{22}|+|r_k-c_{24}| \quad (20)$$

$$D_e(1,2)=|r_a-c_9|+|r_c-c_{11}|+|r_e-c_{16}|+|r_g-c_{18}|+|r_i-c_{23}|+|r_k-c_{25}| \quad (21)$$

$$D_e(1,3)=|r_a-c_{10}|+|r_c-c_{12}|+|r_e-c_{17}|+|r_g-c_{19}|+|r_i-c_{24}|+|r_k-c_{26}| \quad (22)$$

$$D_e(2,0)=|r_a-c_{14}|+|r_c-c_{16}|+|r_e-c_{21}|+|r_g-c_{23}|+|r_i-c_{28}|+|r_k-c_{30}| \quad (23)$$

$$D_e(2,1)=|r_a-c_{15}|+|r_c-c_{17}|+|r_e-c_{22}|+|r_g-c_{24}|+|r_i-c_{29}|+|r_k-c_{31}| \quad (24)$$

$$D_e(2,2)=|r_a-c_{16}|+|r_c-c_{18}|+|r_e-c_{23}|+|r_g-c_{25}|+|r_i-c_{30}|+|r_k-c_{32}| \quad (25)$$

$$D_e(2,3)=|r_a-c_{17}|+|r_c-c_{19}|+|r_e-c_{24}|+|r_g-c_{26}|+|r_i-c_{31}|+|r_k-c_{33}| \quad (26)$$

Next, an explanation will be made of the case of the odd number field. In this case, in the same way as the case of the even number field, the pixel data $c_0$ to $c_{34}$ of all the candidate blocks Bb0 (of which there are 12) in the search range E0 for a reference block Bp0 are used perform the calculation shown in the following formulas (27) to (38) based on formula (1) for the pixel data r of the odd number field of the reference block Bp0 and thereby find the sum of the absolute differences $D_o$(i,j) the odd number field (0≦i<2, 0≦j<3):

$$D_o(0,0)=|r_a-c_1|+|r_d-c_3|+|r_f-c_8|+|r_h-c_{10}|+|r_j-c_{15}|+|r_l-c_{17}| \quad (27)$$

$$D_o(0,1)=|r_b-c_2|+|r_d-c_4|+|r_f-c_9|+|r_h-c_{11}|+|r_j-c_{16}|+|r_l-c_{18}| \quad (28)$$

$$D_o(0,2)=|r_b-c_3|+|r_d-c_5|+|r_f-c_{10}|+|r_h-c_{12}|+|r_j-c_{17}|+|r_l-c_{19}| \quad (29)$$

$$D_o(0,3)=|r_b-c_4|+|r_d-c_6|+|r_f-c_{11}|+|r_h-c_{13}|+|r_j-c_{18}|+|r_l-c_{20}| \quad (30)$$

$$D_o(1,0)=|r_b-c_8|+|r_d-c_{10}|+|r_f-c_{15}|+|r_h-c_{17}|+|r_j-c_{22}|+|r_l-c_{24}| \quad (31)$$

$$D_o(1,1)=|r_b-c_9|+|r_d-c_{11}|+|r_f-c_{16}|+|r_h-c_{18}|+|r_j-c_{23}|+|r_l-c_{25}| \quad (32)$$

$$D_o(1,2)=|r_b-c_{10}|+|r_d-c_{12}|+|r_f-c_{17}|+|r_h-c_{19}|+|r_j-c_{24}|+|r_l-c_{26}| \quad (33)$$

$$D_o(1,3)=|r_b-c_{11}|+|r_d-c_{13}|+|r_f-c_{18}|+|r_h-c_{20}|+|r_j-c_{25}|+|r_l-c_{27}| \quad (34)$$

$$D_o(2,0)=|r_b-c_{15}|+|r_d-c_{17}|+|r_f-c_{22}|+|r_h-c_{24}|+|r_j-c_{29}|+|r_l-c_{31}| \quad (35)$$

$$D_o(2,1)=|r_b-c_{16}|+|r_d-c_{18}|+|r_f-c_{23}|+|r_h-c_{25}|+|r_j-c_{30}|+|r_l-c_{32}| \quad (36)$$

$$D_o(2,2)=|r_b-c_{17}|+|r_d-c_{19}|+|r_f-c_{24}|+|r_h-c_{26}|+|r_j-c_{31}|+|r_l-c_{33}| \quad (37)$$

$$D_o(2,3)=|r_b-c_{18}|+|r_d-c_{20}|+|r_f-c_{25}|+|r_h-c_{27}|+|r_j-c_{32}|+|r_l-c_{34}| \quad (38)$$

Finally, for the frame, in the same way as the case of the processing for detection of a motion vector for a frame mentioned above, calculation of the formulas (3) to (14) is performed based on formula (1) for the pixel data c ($c_0$ to $c_{34}$) of all the candidate blocks in the search range E0 for the reference block Bp0 to find the sum of absolute differences D(i,j) of the frame (0≦i<2, 0≦j<3).

Next, the smallest sum of the absolute differences min-$D_e$(i,j) is found based on formula (2) from all the sums of the absolute differences $D_e$(i,j) at the even number field to obtain the motion vector $MV_e$(x,y) at the even number field.

Further, the smallest sum of the absolute differences min$D_o$(i,j) is found based on formula (2) from all the sums of the absolute differences $D_o$(i,j) at the odd number field to obtain the motion vector $MV_o$(x,y) at the odd number field.

Similarly, the smallest sum of the absolute differences minD(i,j) is found based on formula (2) from all the sums of absolute differences D(i,j) at a frame to obtain the motion vector MV(x,y) at the frame.

Next, in the same way as above, the sum of the absolute differences $D'_e$(i,j) at the even number field (0≦i<2, 0≦j<3), the sum of the absolute differences $D'_o$(i,j) at the odd number field (0≦i<2, 0≦j<3), and the sum of the absolute differences D'(i,j) at the frame (0≦i<2, 0≦j<3) are found based on formula (1) for the pixel data $r_{a'}$ to $r_{l'}$ of the reference block Bp1 adjoining the reference block Bp0 and the pixel data $c_{21}$ to $c_{55}$ of all the candidate blocks Bb1 (of which there are 12) in the search range E1 of the reference block Bp1.

Here, the smallest sums of absolute differences $D'_e$(i,j), min$D'_o$(i,j), and minD'(i,j) are found based on formula (2) for the thus found sums of absolute differences $D'_e$(i,j) (0≦i<2, 0≦j<3), $D'_o$(i,j) (0≦i<2, 0≦j<3), and D'(i,j) (0≦i<2, 0≦j<3) to obtain the three types of motion vectors $MV_e$(x,y), $MV_o$(x,y), and MV(x,y) at the even number field, odd number field, and frame, respectively.

Below, in the same way, the above operation is repeated for all the other reference blocks Bp in the current frame Fp to find the three types of motion vectors $MV_e$(x,y), $MV_o$(x, y), and MV(x,y) at the even number field, odd number field, and frame.

The above processing for detection of a motion vector of a field is also realized by the circuit configuration shown in FIGS. 1, 2, and 3. That is, three of the motion vector detection circuits (processing circuits) of the configurations of FIGS. 1, 2, and 3 are provided and processing for detection of the motion vector at an even number field, processing for detection of the motion vector at an odd number field, and processing for detection of the motion vector at a frame are performed separately by these three motion vector detection circuits.

As explained above, with this circuit configuration for processing for detection of a motion vector for a field, the sums of the absolute differences at the even number field, odd number field, and frame are found by separately provided circuits. Since it is necessary to provide three motion vector detection circuits corresponding to the even number field, odd number field, and frame to perform the processing for detection of motion vectors, the amount of hardware increases.

In addition, since three motion vector detection circuits have to be provided to perform the processing for detection of the motion vector of a field, it becomes necessary to separately supply each of these three circuits with the pixel data of the reference block and the pixel data of the candidate blocks. Accordingly, compared with the circuit configuration in the case of performing processing for detection of the motion vector of just a frame, explained earlier, the circuit configuration for the processing for detection of a motion vector of a field requires additional external circuits and becomes more complicated. Therefore, an increase in the number of ports of the frame memory supplying the pixel data to the motion vector detection circuits is caused.

Further, the processing for detection of a motion vector by the block-matching method had been performed based on only one of a number of signal elements of a reference block of the current frame and the candidate blocks of the previous frame, for example, the luminance signal. Even if the luminance signal components of the pixels of a reference block and candidate block resemble each other, however, it is possible that other signal components, for example, the chrominance signals, will completely differ. Accordingly, when searching for the candidate block with the strongest resemblance to the reference block based on just the luminance signal, a candidate block with a completely different image may end up detected as the candidate block with the strongest resemblance.

When erroneously detecting the candidate block with the strongest resemblance in this way, the encoding efficiency of the compression and encoding of the motion picture information after compensation by a motion vector falls.

Further, as the search range in the previous frame is increased to improve the encoding efficiency, the likely resemblance of the luminance signals of a reference block and a candidate block also increases. But the chance of erroneously detecting a candidate block with completely different chrominance signals as the candidate block with the strongest resemblance also increases.

Accordingly, there is the problem that despite the broadening of the search range for improving the encoding efficiency, there is a change of a reverse phenomenon occurring of reduction of the encoding efficiency compared with the case of a narrower search range.

SUMMARY OF THE INVENTION

An object of the present invention is to provide a processing circuit which enables a reduction of the amount of hardware, a reduction in the external circuits added, and a reduction of the number of ports of the frame memory.

Another object of the present invention is to provide a processing circuit which is able to detect a candidate block having the smallest difference between the plurality of signal elements of corresponding pixels of a reference block and that candidate block as the candidate block having the strongest resemblance to the reference block.

Still another object of the present invention is to provide a processing circuit which is able to accurately detect a motion vector based on a plurality of signal elements and is thereby able to improve the efficiency of compression and encoding of a motion picture and which is able to prevent the above-mentioned reverse phenomenon.

A further object of the present invention is to provide a processing circuit which is able to improve the speed of processing for detection of a motion vector.

According to the present invention, there is provided an image signal processing circuit for detection of a motion vector by dividing one frame unit of an image signal into a plurality of blocks, each block comprising a predetermined number of pixel data, and performing a search over all frames of the image signal by a block-matching method as a block size of a reference block of a current frame of the image signal being M×N pixels and the number of candidate blocks of a previous frame of the image signal being M×N, to detect the motion vector of the image signal.

The processing circuit comprises:

M×N number of processing units, arranged in a predetermined array, for calculating evaluation values which are defined as the differences of pixel data of the reference block and pixel data of the candidate blocks, and for accumulating these evaluation values to obtain the sum of the evaluation values;

first adders, each providing in each of the even number processing unit, for connecting in a pipeline the outputs of the even number processing units in the array;

second adders, each providing in each of the odd number processing unit, for connecting in a pipeline the outputs of the odd number processing units in the array as a separate system from the first adders;

a first pixel data supply unit from which the pixel data of the reference block are supplied;

a second pixel data supply unit from which the pixel data of even number columns of the candidate blocks are supplied; and a third pixel data supply unit from which the pixel data of odd number columns of the candidate blocks are supplied, the processing circuit performing detection of the motion vector able to simultaneously obtain three types of motion vectors, the motion vector at the even number field, the motion vector at the odd number field, and the motion vector at the frame.

The processing units obtain the absolute differences between the pixel data of the reference block and the pixel data of the candidate blocks and accumulate the absolute differences to calculate the sum of the absolute differences.

Alternatively, the processing units obtain the squared differences of the pixel data of the reference block and the pixel data of the candidate blocks and accumulate the squared differences to calculate the sum of the squared differences.

Preferably, the M×N number of processing units are arranged in an M×N matrix.

According to the present invention, there is also provided an image signal processing circuit for detection of a motion vector by dividing one frame unit of an image signal into a plurality of blocks, each block comprising a predetermined number of pixel data, and performing a search over all frames of the image signal by the block-matching method, as a block size of a reference block of a current frame of the image signal being M×N pixels, and the number of candidate blocks of a previous frame of the image signal being M×N, to detect the motion vector of the image signal.

The processing circuit comprises:

M×N number of processing units, arranged in a predetermined array, for calculating evaluation values, defined as the differences of pixel data of the reference block and pixel data of the candidate blocks, and accumulating separately the even number evaluation values and odd number evaluation values to obtain the sums of the evaluation values;

a first pixel data supply unit from which the pixel data of the reference block are supplied;

a second pixel data supply unit from which the pixel data of even number columns of the candidate blocks are supplied; and a third pixel data supply unit from which the pixel data of odd number columns of the candidate blocks are supplied;

the processing circuit performing detection of the motion vector able to simultaneously obtain three types of motion vectors, the motion vector at the even number field, the motion vector at the odd number field, and the motion vector at the frame.

According to the present invention, there is further provided an image signal processing circuit for detection of a motion vector by dividing one frame unit of an image signal into a plurality of blocks, each block comprising a predetermined number of pixel data, and performing a search over all frames of the image signal by the block-matching method, as a block size of a reference block of a current frame of the image signal being M×N pixels, and the number of candidate blocks of a previous frame of the image signal being M×N, to detect the motion vector, the processing circuit comprising:

M×N number of processing units, arranged in a predetermined array, for calculating evaluation values, defined as the differences of pixel data of the luminance signal component and chrominance signal component or color signal component of the reference block and pixel data of luminance signal component and chrominance signal component of the candidate blocks, and accumulating these evaluation values to obtain the sum of the evaluation values;

a first pixel data supply unit from which the pixel data of the reference block are supplied; and a second pixel data supply unit from which the pixel data of the candidate blocks are supplied;

the M×N number of processing circuit being connected in a pipeline.

BRIEF DESCRIPTION OF THE DRAWINGS

These and other objects and features of the present invention will become more apparent from the following description of preferred embodiments made with reference to the attached drawings, in which:

FIG. 4 is a view for explaining the control timing of the processing for detection of a motion vector of FIG. 1;

FIG. 9 is a view for explaining the timing of the control of the processing for detection of a motion vector in an even number field in the processing circuit of the first embodiment;

FIG. 10 is a view for explaining the timing of the control of the processing for detection of a motion vector in an odd number field in the processing circuit of the first embodiment;

FIG. 13 is a view for explaining the timing of the control of the processing for detection of a motion vector in an odd number field in the processing circuit of the second embodiment;

FIGS. 22A and 22B are views for explaining the processing for detection of a motion vector, wherein FIG. 22A shows the reference block and candidate blocks of the luminance signal Y component and FIG. 22B shows the reference block and candidate blocks of the chrominance signal $C_r$ and $C_b$ component;

DESCRIPTION OF THE PREFERRED EMBODIMENTS

FIRST EMBODIMENT

A first embodiment of a processing circuit according to the present invention will be described.

The processing circuit of the first embodiment of the present invention performs signal-processing for detection of a motion vector by conducting a full search by a block-matching method using a block size of a reference block Bp of a current frame Fp of M×N pixels, here for example 3×4 pixels, and M×N number of candidate blocks of a previous frame Fb, here, for example, 3×4.

Figure 1:
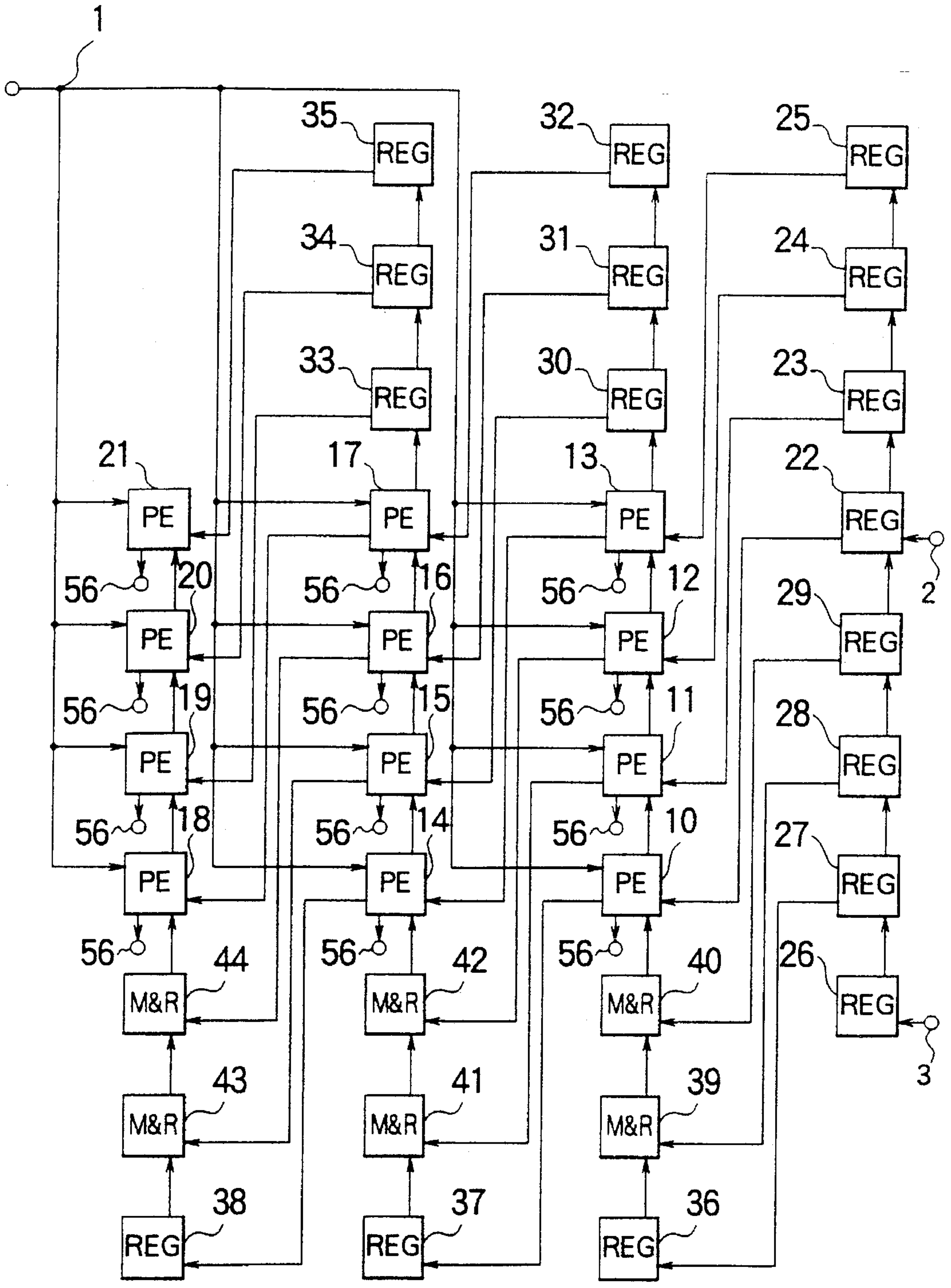
FIG. 1 is a block diagram showing the overall configuration of a processing circuit for performing the processing for detection of a motion vector for a frame.
Figure 2:
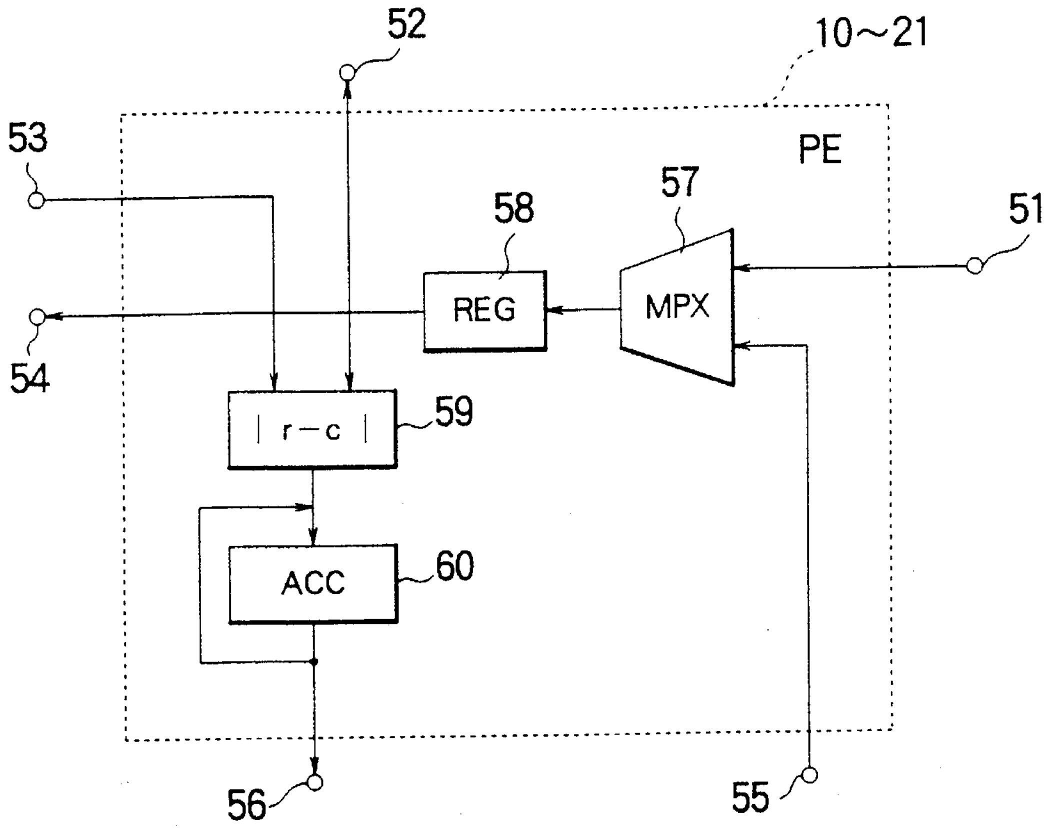
FIG. 2 is a block diagram showing a specific configuration of a processing unit of the processing circuit of FIG. 1.
Figure 3:
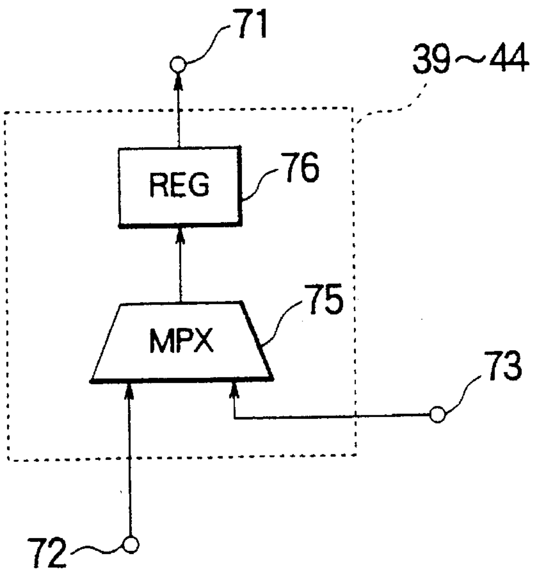
FIG. 3 is a block diagram showing a specific configuration of a multiplexer-equipped pixel data storage register of the processing circuit of FIG. 1.
Figure 5:
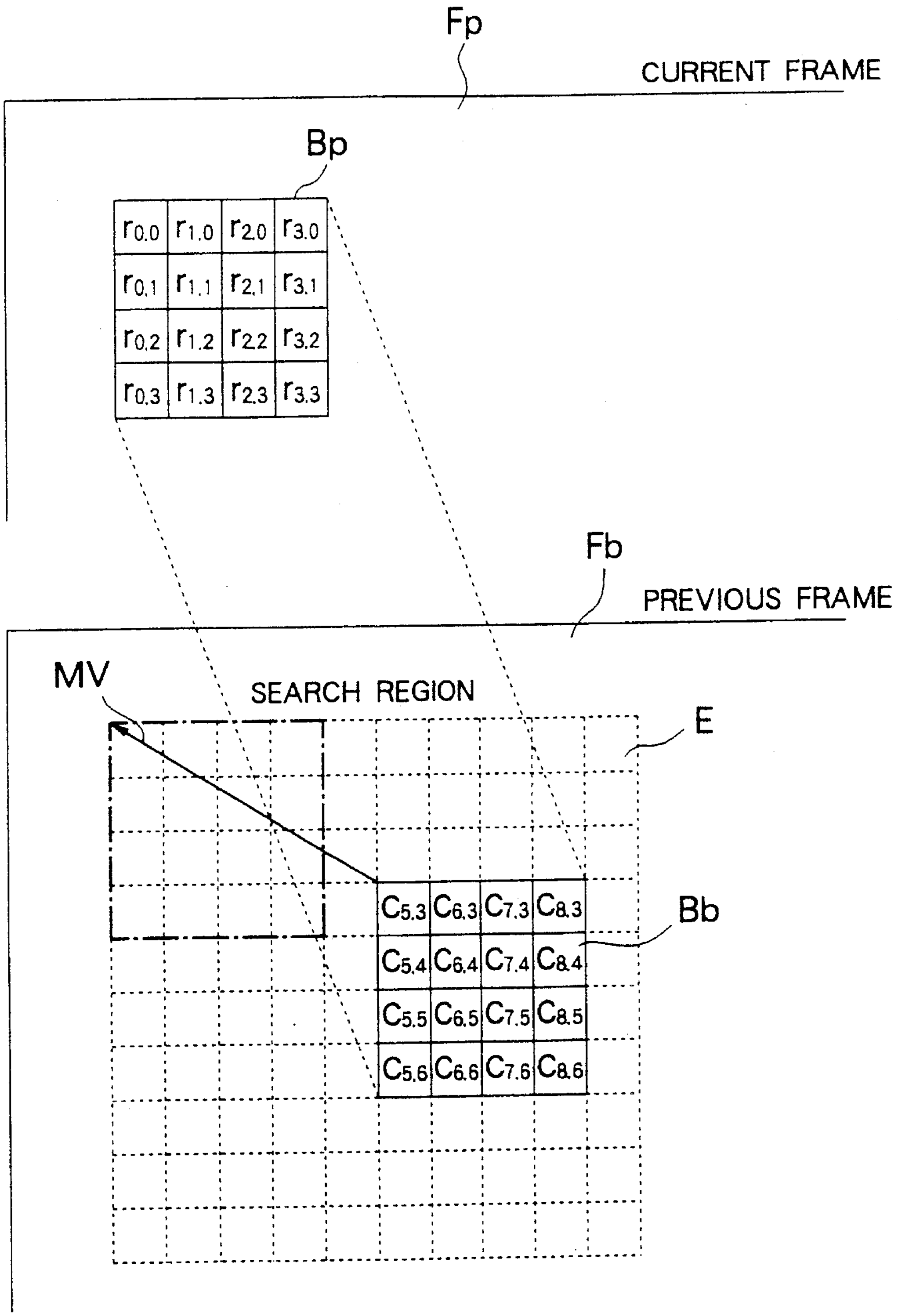
FIG. 5 is a view of the principle of the processing for detection of a motion vector.
Figure 6:
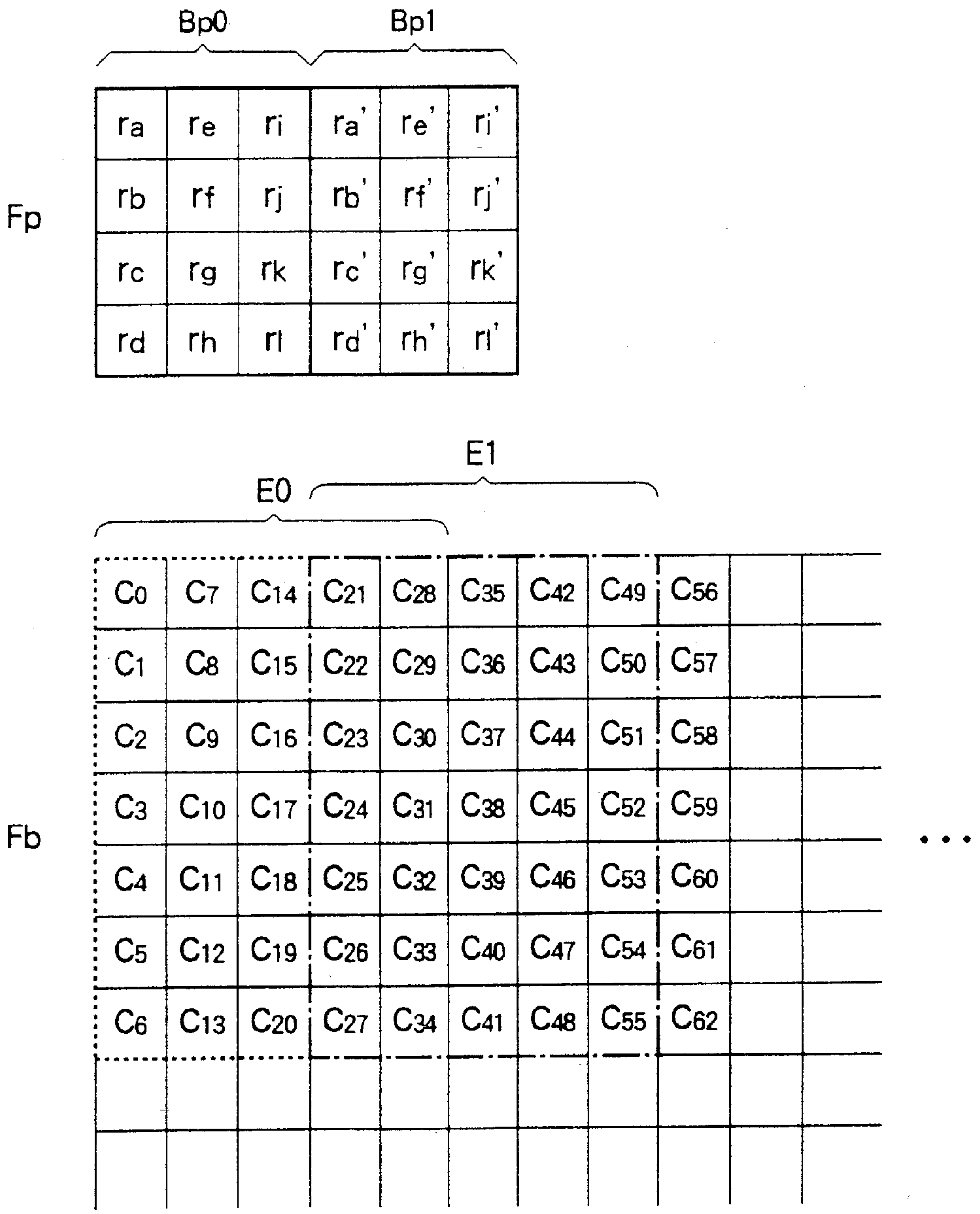
FIG. 6 is a view for explaining the processing for detection of a motion vector in the case of a block size of the reference block of 3×4 pixels and 3×4 number of candidate blocks.
Figure 7:
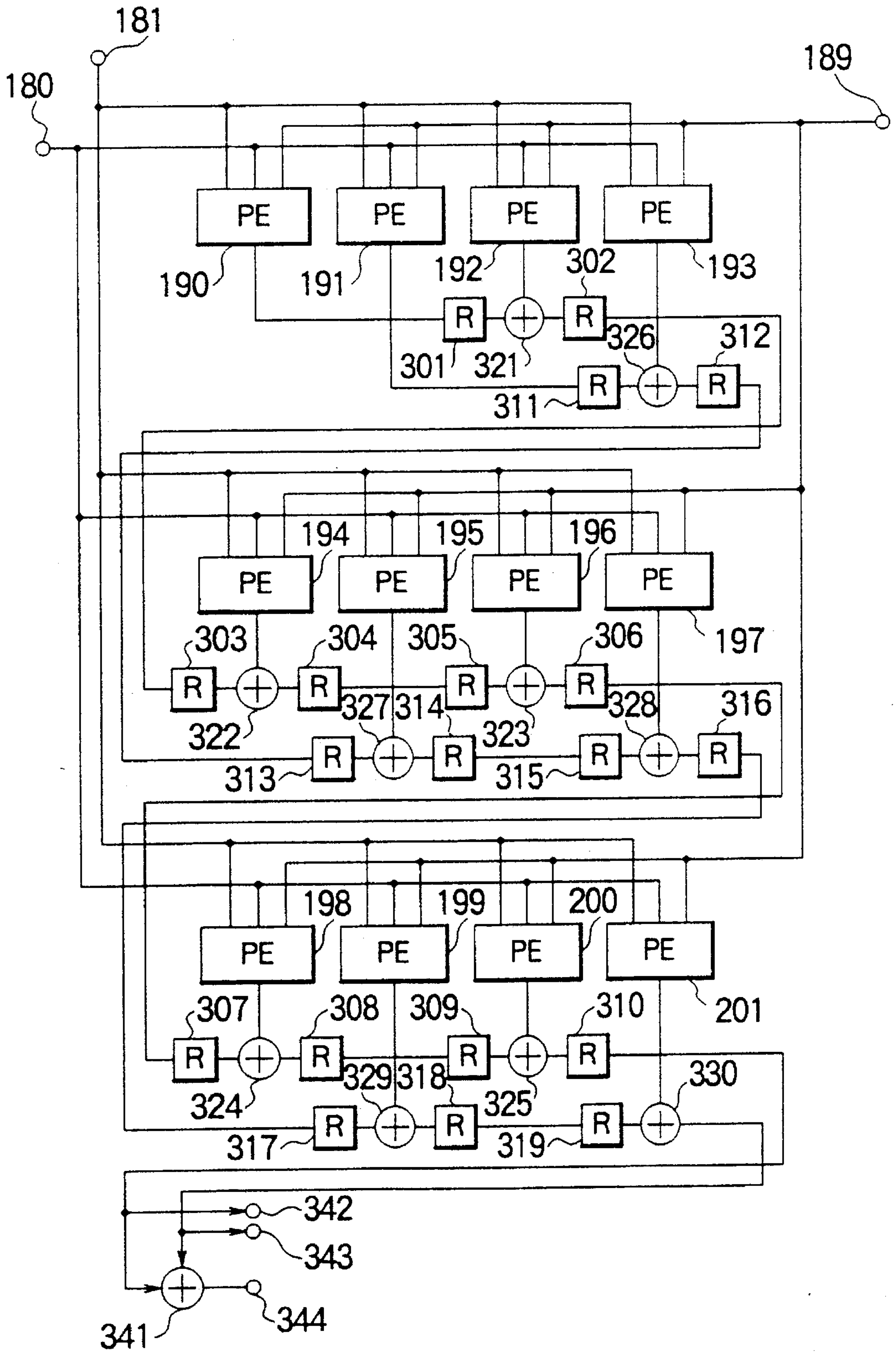
FIG. 7 is a block diagram showing the overall configuration of a processing circuit of a first embodiment for performing the processing for detection of a motion vector for a field.
Figure 8A:
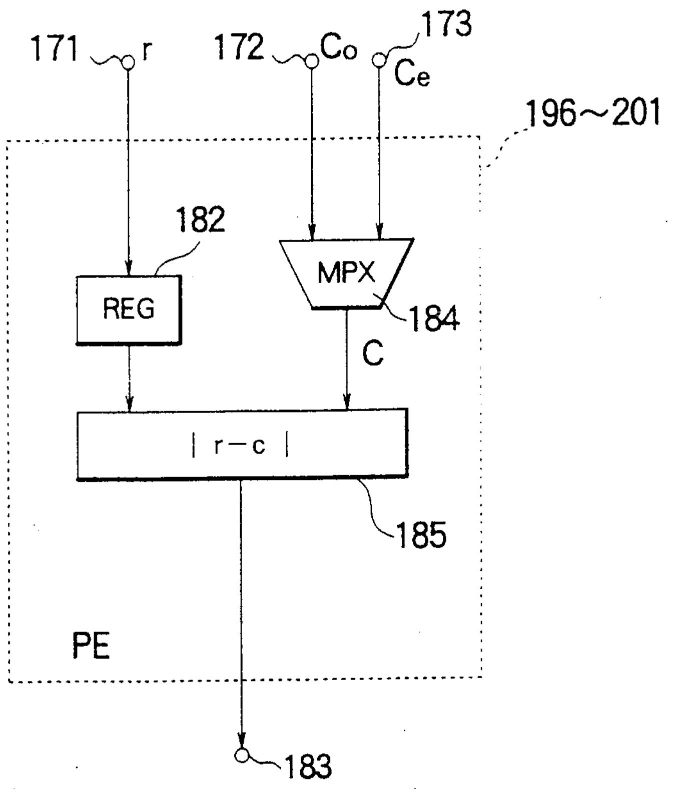
FIGS. 8A and 8B are block diagrams showing specific configurations of a processing unit of the processing circuit of the first embodiment.
Figure 8B:
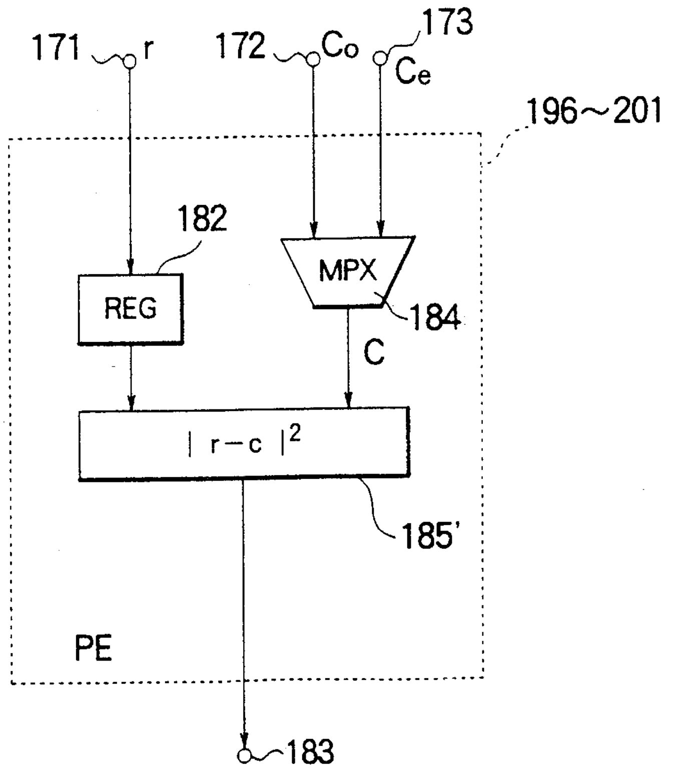

Here, the processing circuit of the first embodiment of the present invention, as shown in FIG. 7 and FIGS. 8A and 8B, is provided with M×N number of signal processing units (PE) (3×4=12 processing units 190 to 201) each comprised of: a register 182 for holding for a predetermined number of clock cycles (for example, 12 clock cycles). The pixel data r of the reference block Bp sequentially input at each clock cycle, a multiplexer 184 for suitably switching (multiplexing) the pixel data c of the candidate block Bb ($c_o$ being odd number field (column) image data and $c_e$ being even number field (column) image data) between odd number columns and even number columns, and an absolute difference processor 185 in FIG. 8A (or a squared difference processor 185' in FIG. 8B for calculating a squared of a difference (squared difference)) for calculating an evaluation value expressly the difference between the pixel data r of the reference block Bp output from the register 182 and the pixel data c of the candidate blocks Bb output from the multiplexer 184, for example, the absolute difference (or the squared difference). The processing units 190 to 201 are arranged in an M×N (for example, 3×4) matrix.

Here, a column means a unit of pixels in the vertical direction.

Further, the processing circuit of the first embodiment connects in a pipeline the outputs of the even number processing units 190, 192, 194, 196, 198, and 200 through corresponding first adders 321 to 325, connects in a pipeline the outputs of the odd number processing units 191, 193, 195, 197, 199, and 201 through another system of second adders 326 to 330, and supplies the pixel data of the reference block and candidate blocks in a predetermined sequence to the absolute difference processors 185 (or squared difference processors 185') of the processing units 190 to 201 so as to find the sums of absolute differences $D_e(i,j)$ (or sums of squared differences) at the even number field and the sums of absolute differences $D_o(i,j)$ (or sums of squared differences) at the odd number field and adds by the adder 341 the sums of absolute differences (or sums of squared differences) at the even number field and sums of absolute differences (or sums of squared differences) at the odd number field so as to find the sums of absolute differences D(i,j) (or sums of squared differences) at the frame.

In the processing circuit of the present invention, the smallest sums of the absolute differences (or sums of squared differences) are found from the sums of absolute differences $D_e(i,j)$ (or sums of squared differences) the even number field, the sums of absolute differences $D_o(i,j)$ (or sums of squared differences) at the odd number field, and the sums of absolute differences D(i,j) (or sums of squared differences) at the frame, respectively, thereby realizing processing for detection of a motion vector which simultaneously finds the motion vector $MV_e(x,y)$ at the even number field, the motion vector $MV_o(x,y)$ at the odd number field, and the motion vector MV(x,y) at the frame.

Note that while illustration was omitted, the processing circuit of the first embodiment of the present invention is further provided with memories for storing the sums of absolute differences $D_e(i,j)$, $D_o(i,j)$, D(i,j) (or sums of squared differences) with the reference block for all the candidate blocks found at the odd number field, even number field, and frame. From the sums of the absolute differences (or sums of squared differences) stored in the memory, the smallest sums of absolute differences (or sums of squared differences) for finding the motion vectors $MV_e(x,y)$, $MV_o(x,y)$, and MV(x,y) are found.

In the following description, the configuration for the calculation of the absolute differences will be described.

The circuit of the first embodiment performs detection of a motion vector for a field by the following.

Namely, the relationship shown in formula (39) stands among the sums of absolute differences $D_e(i,j)$ (or sums of squared differences) at the even number field ($0 \leqq i<2$, $0 \leqq j<3$), the sums of absolute differences $D_o(i,j)$ (or sums of squared differences) at the odd number field ($0 \leqq i<2$, $0 \leqq j<3$), and the sums of absolute differences $D(i,j)$ (or sums of squared differences) at the frame ($0 \leqq i<2$, $0 \leqq j<3$):

$$D(i,j)=D_e(i,j)+D_o(i,j) \quad (39)$$

From formula (39), the sums of absolute differences $D(i,j)$ at the frame can be found from the sums of absolute differences $D_e(i,j)$ at the even number field and the sums of absolute differences $D_o(i,j)$ at the odd number field.

Below, a more detailed explanation will be given of the processing circuit of the first embodiment of the present invention referring to FIG. 7 to FIG. 11. Note that in this embodiment, the explanation will be made of the circuit configuration and control system of the present invention using the example of the processing for detection of a motion vector mentioned above for explaining the conventional circuit configuration.

In this embodiment of the present invention, the processing for detection of the motion vector of a field is realized by the circuit configuration shown in FIG. 7 and FIG. 8. FIG. 7 shows the overall configuration of a processing circuit for performing the processing for detection of a motion vector in the embodiment of the present invention. As explained above, this circuit is comprised of the processing units 190 to 201 arranged in a 3×4 matrix.

In FIG. 7, the pixel data $c_o$ of the candidate blocks Bb of the odd number columns of the previous frame Fb are supplied to the terminal 180. The pixel data $c_o$ are then sent to the first input terminal of the processing units 190 to 201. The pixel data $c_e$ of the candidate blocks Bb of the even number columns of the previous frame Fb are supplied to the terminal 189. The pixel data $C_e$ are then sent to the second input terminal of the processing units 190 to 201. The pixel data r of the reference block Bp are supplied to the terminal 181 and are then sent to the third input terminal of the processing units 190 to 201. Absolute differences are then output from the output terminals of these processing units 190 to 201.

Here, the processing units 190 to 201 each have the internal configuration shown in FIG. 8. Namely, the processing units 190 to 201 are each comprised of a multiplexer 184, a pixel data storage register 182, and an absolute difference processor 185. In FIG. 8, the pixel data $c_o$ of the candidate blocks Bb of the odd number columns of the previous frame Fb obtained through the terminal 180 of FIG. 7 are supplied to the first input terminal 172, while the pixel data $c_e$ of the candidate blocks Bb of the even number columns of the previous frame Fb obtained through the terminal 189 of FIG. 7 are supplied to the second input terminal 173. These pixel data $c_o$ and $c_e$ are suitably switched by the multiplexer 184, then are input to one of the input terminals of the absolute difference processor 185. Further, the pixel data r of the reference block Bp obtained through the terminal 181 of FIG. 7 are supplied to the third terminal 171. The pixel data r are supplied to the other input terminal of the absolute difference processor 185 through the pixel data storage register 182. The absolute difference obtained at the absolute difference processor 185 is output from the terminal 183.

Referring to FIG. 7, in the circuit of this embodiment, as explained above, the outputs of the even number processing units 190, 192, 194, 196, 198, and 200 are connected in a pipeline through the corresponding first adders 321 to 325 and the outputs of the odd number processing units 191, 193, 195, 197, 199, and 201 are connected in a pipeline through the second adders 326 to 330.

Namely, explaining this using the even number processing units, in the circuit of the present embodiment, the output of the processing unit 190 and the output of the processing unit 192 are added by the adder 321, the added output of the adder 321 and the output of the processing unit 194 are added by the adder 322, the added output of the adder 322 and the output of the processing unit 196 are added by the adder 323, the added output of the adder 323 and the output of the processing unit 198 are added by the adder 324, and the added output of the adder 324 and the output of the processing unit 200 are added by the adder 325. As a result, the added output of the final stage first adder 325 becomes the sum of the absolute differences $D_e(i,j)$ in the even number field. The sum of the absolute differences $D_e(i,j)$ in the even number field is output from the even number field output terminal 342 of the circuit of this embodiment of the present invention.

Further, in the odd number processing units, the output of the processing unit 191 and the output of the processing unit 193 are added by the adder 326, the added output of the adder 326 and the output of the processing unit 195 are added by the adder 327, the added output of the adder 327 and the output of the processing unit 197 are added by the adder 328, the added output of the adder 328 and the output of the processing unit 199 are added by the adder 329, and the added output of the adder 329 and the output of the processing unit 201 are added by the adder 330. Consequently, the added output of the final stage second adder 330 becomes the sum of the absolute differences $D_o(i,j)$ in the odd number field. The sum of the absolute differences $D_o(i,j)$ in the odd number field is output from the odd number field output terminal 343 of the circuit of this embodiment of the present invention.

Note that in FIG. 7, the registers 301 to 319 connected to the input terminal side and output terminal side of the first and second adders (inserted between the adders) are pipeline registers.

Further, the sum of the absolute differences $D_e(i,j)$ in the even number field and the sum of the absolute differences $D_o(i,j)$ in the odd number field are added by the adder 341. The added output of the adder 341 becomes the sum of the absolute differences $D(i,j)$ in the frame. The sum of the absolute differences $D(i,j)$ in the frame is output from the frame output terminal 344 of the circuit of this embodiment of the present invention.

Next, an explanation will be made of the control system for realizing the processing for detection of a motion vector for a field using the circuit configuration of FIG. 7 and FIGS. 8A and 8B. FIG. 9 and FIG. 10 are timing charts of the operations in the control for the detection of a motion vector of a field using the circuit configuration shown in FIG. 7 and FIGS. 8A and 8B. Note that FIG. 9 shows the timing of the processing at the even number field and FIG. 4 shows the timing of the processing at the odd number field.

The pixel data r of the reference block Bp of the current frame Fb in FIG. 9 and FIG. 10 are successively input to the pixel data storage register 182 shown in FIGS. 8A and 8B each of the processing units 190 to 201 of FIG. 7. The registers 182 each hold for 12 clock cycles the pixel data r of the reference block Bp that were input. Accordingly, in the processing units 190 to 201, each the absolute difference processor 185 calculate the absolute differences with the same pixel data r of the reference block Bp for a period of 12 clock cycles. Note, in the processing units 190 to 201, the absolute difference processors 185 calculate the absolute differences for different pixel data r of the reference block Bp.

Further, the pixel data c of the candidate blocks are divided into two regions, even number columns and odd number columns of the frame Fb, and are successively input in a certain order from the two input terminals 180 and 182 shown in FIG. 7 to the processing units 190 to 201. At the processing units 190 to 201, the two pixel data $c_o$ and $c_e$ are suitably switched by the multiplexers 184 in the processing units. By doing this, the processing units 190 to 201 perform processing on one or two pixel data c of the candidate blocks Bb at a certain clock cycle as shown in FIG. 9 or FIG. 10.

Further, in the circuit of the first embodiment, the outputs from the absolute difference processors 185 of the even number processing units 190, 192, 194, 196, 198, and 200 are successively added using the first adders 321 to 325 connected in a pipeline as mentioned above and the sum of absolute differences $D_e(i,j)$ at the even number field is calculated. On the other hand, the outputs from the absolute difference processors 185 of the odd number processing units 191, 193, 195, 197, 199, and 201 are successively added using the second adders 326 to 330 connected in a pipeline as mentioned above and the sum of absolute differences $D_o(i,j)$ at the odd number field is calculated. Further, in the circuit of this embodiment, the sums of the absolute differences $D_e(i,j)$ and $D_o(i,j)$ in the even and odd number fields are added by the adder 341 to calculate the sum of the absolute differences D(i,j) in the frame.

By performing the control explained above, in the circuit of the first embodiment, three types of sums of absolute values of differences are output from the even number field output terminal 342, =he odd number field output terminal 343, and the frame output terminal 344 each clock cycle. By comparing the magnitude (amplitude) of the sums of absolute values of differences, it is possible to find the three types of motion vectors $MV_e(x,y)$, $MV_o(x,y)$, and MV(x,y) at the even number. field, odd number field, and frame.

SECOND EMBODIMENT

Figure 11:
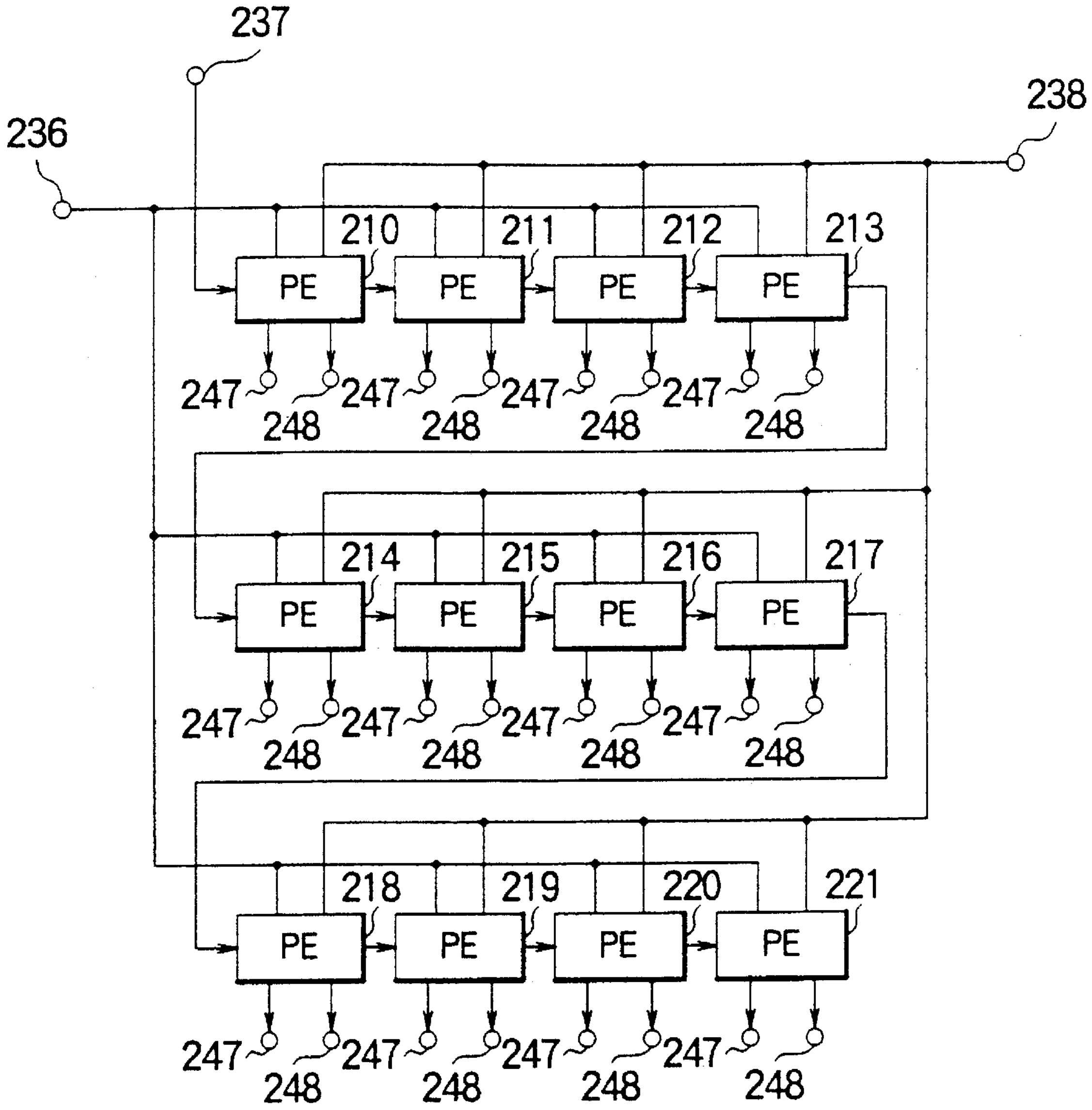
FIG. 11 is a block diagram showing the overall configuration of a processing circuit of a second embodiment for performing the processing for detection of a motion vector for a field.
Figure 12A:
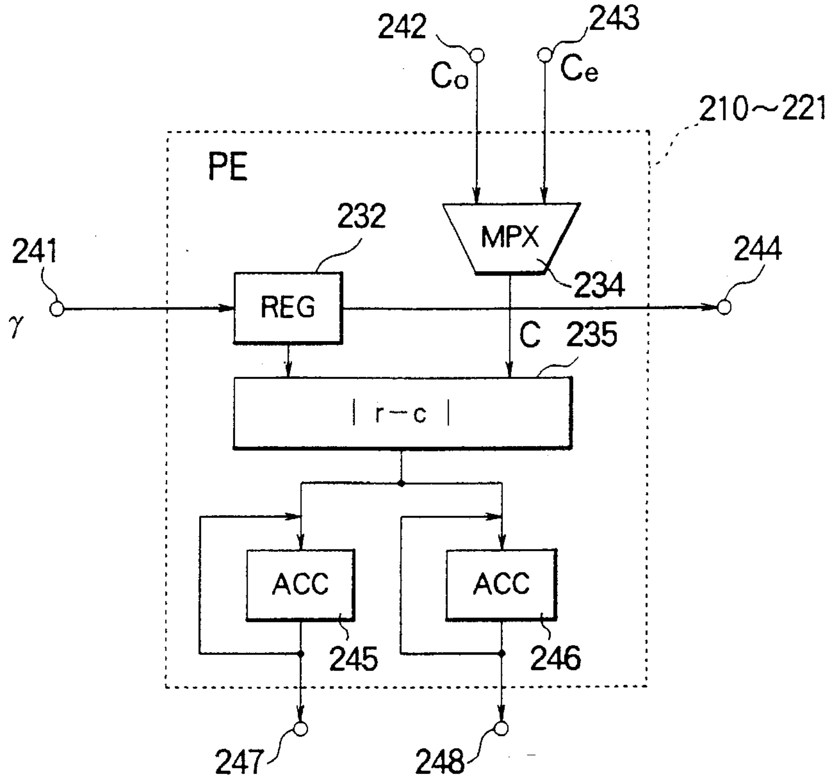
FIGS. 12A and 12B are block diagrams showing specific configurations of a processing unit of a processing circuit of the second embodiment.
Figure 12B:
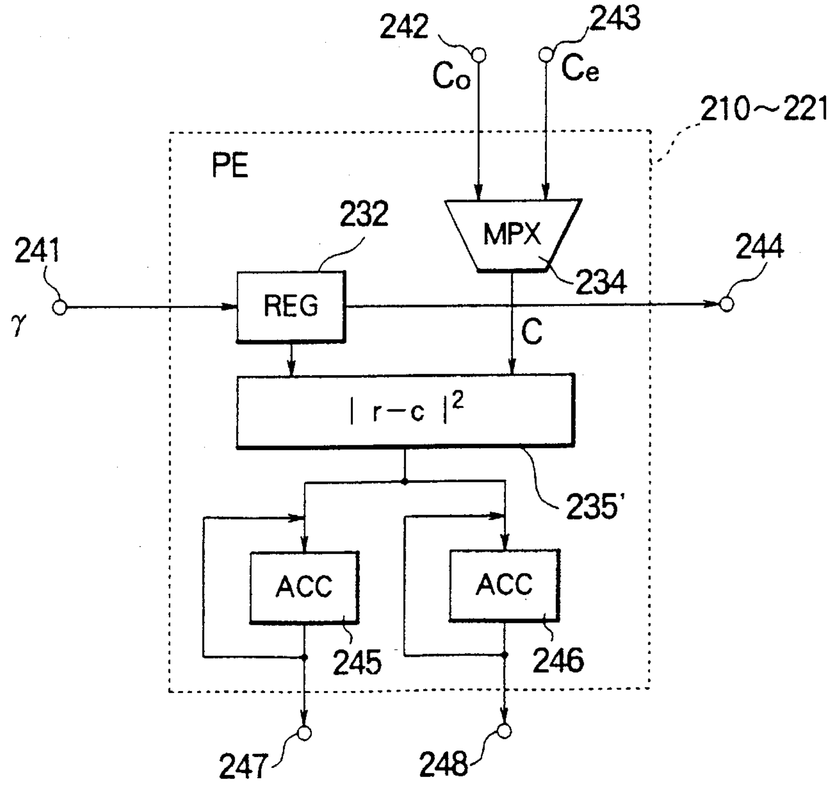

The processing circuit of a second embodiment of the present invention, as shown in FIG. 11 and FIGS. 12A and 12B, is provided with M×N number of processing units (PE) (3×4=12 processing units 210 to 221) each comprised of a register 232 for holding for a predetermined number of clock cycles (for example, 12 clock cycles). The pixel data r of the reference block Bp sequentially input at each clock cycle, a multiplexer 234 for suitably switching the pixel data c of the candidate blocks Bb ($c_o$ being odd number field (column) image data and $c_e$ being even number field (column) image data) between odd number columns and even number columns, an absolute difference processor 235 in FIG. 12A (or squared difference processor 235' in FIG. 12B) for calculating an evaluation value expressed by a difference between the pixel data r of the reference block Bp output from the register 232 and the pixel data c of the candidate blocks Bb output from the multiplexer 234, for example, the absolute difference (or the squared difference), an even number accumulator 245 for accumulating the even number outputs from the absolute difference processor 235, and an odd number accumulator 246 for accumulating the odd number outputs from the absolute difference processor 235. The processing units 210 to 221 are connected arranged in an M×N (that is, 3×4) matrix.

The processing circuit of the second embodiment is supplied with the pixel data r and c ($c_o$, $c_e$) of the reference block Bp and the candidate blocks Bb in a certain sequence so as to obtain the sums of absolute differences $D_e(i,j)$ (or sums of squared differences) at the even number field and the sums of absolute differences $D_o(i,j)$ (or sums of squared differences) at the odd number field and further adds the sums of absolute differences (or sums of squared differences) at the even number field and sums of absolute differences (or sums of squared differences) at the odd number field so as to obtain the sums of absolute differences D(i,j) (or sums of squared differences) at the frame.

In the processing circuit of the second embodiment of the present invention as well, the smallest sums of the absolute differences (or sums of squared differences) are found from the sums of absolute differences $D_e(i,j)$ (or sums of squared differences) at the even number field, the sums of absolute differences $D_o(i,j)$ (or sums of squared differences) at the odd number field, and the sums of absolute differences D(i,j) (or sums of squared differences) at the frame, respectively, thereby realizing processing for detection of a motion vector which simultaneously finds the motion vector $MV_e(x,y)$ at the even number field, the motion vector $MV_o(x,y)$ at the odd number field, and the motion vector MV(x,y) at the frame.

Note that while illustration was omitted, the processing circuit of this embodiment of the present invention is further provided with memories for storing the sums of absolute differences $D_e(i,j)$, $D_o(i,j)$, D(i,j) (or sums of squared differences) with the reference block for all the candidate blocks obtained at the odd number field, even number field, and frame. From the sums of the absolute differences (or sums of squared differences) stored in the memory, the smallest sums of absolute differences (or sums of squared differences) for finding the motion vectors $MV_e(x,y)$, $MV_o(x,y)$, and MV(x,y) are obtained.

Note that in FIG. 11, the pixel data $c_o$ of the candidate blocks Bb of the odd number columns of the previous frame Fb are supplied to the terminal 236. The pixel data $c_o$ are then sent to the first input terminal of the processing units 210 to 221. The pixel data $c_e$ of the candidate blocks Bb of the even number columns of the previous frame Fb are supplied to the terminal 238. The pixel data $c_e$ are then sent to the second input terminal of the processing units 210 to 221. The pixel data r of the reference block Bp are supplied to the terminal 237, are then sent to the third input terminal of the first-stage processing unit 210 of the cascade-connected processing units 210 to 221, then are successively supplied to the third input terminal of the next stage processing unit. Absolute differences $D_e(i,j)$ at the even number field and $D_o(i,j)$ at the odd number field are then output from the two output terminals 247 and 248 corresponding to these processing units 210 to 221.

Here, the processing units 210 to 221, as shown in FIGS. 12A and 12B, are each comprised of a multiplexer 234, a pixel data storage register 232, an absolute difference processor 235, an accumulator (ACC) 245 for finding the sum of absolute differences $D_e(i,j)$ at the even number field, and an accumulator (ACC) 246 for finding the sum of absolute differences $D_o(i,j)$ at the odd number field.

In FIG. 12, the pixel data $c_o$ of the candidate blocks Bb of the odd number columns of the previous frame Fb obtained through the terminal 236 of FIG. 11 are supplied to the first input terminal 242, while the pixel data $c_e$ of the candidate blocks Bb of the even number columns of the previous frame Fb obtained through the terminal 238 of FIG. 11 are supplied to the second input terminal 243. These pixel data $c_o$ and $c_e$ are suitably switched by the multiplexer 234, then are supplied to one of the input terminals of the absolute difference processor 235. Further, the pixel data r of the reference block Bp obtained through the terminal 237 of FIG. 11 or the pixel data r from the terminal 244 of the previous stage processing unit are supplied to the third terminal 241. The pixel data r are supplied to the other input terminal of the absolute difference processor 235 through the pixel data storage register 232 and are supplied from the terminal 244 to the next stage processing unit. The output of the absolute difference processor 235 is supplied to the accumulator 245 for obtaining the sum of the absolute differences $D_e(i,j)$ at the even number field and to the accumulator 246 for finding the sum of the absolute differences $D_o(i,j)$ at the odd number field and are accumulated at these accumulators 245 and 246, then output as the sum of the absolute differences $D_e(i,j)$ at the even number field and the sum of the absolute differences $D_o(i,j)$ at the odd number field from the terminals 247 and 248 corresponding to these accumulators 245 and 246.

Next, an explanation will be made of the control system for realizing the processing for detection of a motion vector for a field using the circuit configuration of the second embodiment shown in FIG. 11 and FIGS. 12A and 12B. FIG. 13 is a timing chart of the operations in the control for the detection of a motion vector of a field using the circuit configuration shown in FIG. 11 and FIGS. 12A and 12B.

As shown in FIG. 13, the pixel data r of the reference block Bp are successively input to the pixel data storage register 232 of the first-stage processing unit 210 of FIG. 11 every clock cycle. The pixel data r of the reference block Bp which have been input are supplied to all the processing units 210 to 221 of FIG. 11 over 12 clock cycles. That is, at one clock cycle, the processing units 210 to 221 perform calculation of the absolute differences for different pixel data r of the reference block Bp.

Further, the pixel data c of the candidate blocks are divided into two regions, even number columns and odd number columns of the frame Fb, and successively input in a certain order from the two input terminals 236 and 238 shown in FIG. 11 to the processing units 210 to 221. At the processing units 210 to 221, the two pixel data $c_o$ and $c_e$ are suitably switched by the multiplexer 234 in the processing units so that the pixel data c of the candidate blocks Bv are supplied in the order shown in FIG. 13. By performing the above operation, the processing units 210 to 221 Perform processing on one or two pixel data c of the candidate blocks Bb at a certain clock cycle as shown in FIG. 13.

Further, each of the processing units 210 to 221 supply the even number outputs from the absolute difference processor 235 to the accumulator 245. By this, the sum of the absolute differences $D_e(i,j)$ at the even number field is calculated at the accumulator 245. On the other hand, the odd number outputs from the absolute difference processor 235 are supplied to the accumulator 246. By this, the sum of the absolute differences $D_o(i,j)$ at the odd number field is calculated at the accumulator 246.

By performing the control explained above, in the present embodiment, the sum of the absolute differences $D_e(i,j)$ at the even number field and the sum of the absolute differences $D_o(i,j)$ at the odd number field are output from the processing units 210 to 221 of FIG. 11 every clock cycle (output from the terminals 247 and 248). By comparing the magnitude (amplitude) of the sums of absolute values of differences $D_e(i,j)$ and $D_o(i,j)$, it is possible to find two types of motion vectors $MV_e(x,y)$ and $MV_o(x,y)$ at the even number field and odd number field.

Further, in the circuit of the second embodiment, the sums of absolute values of differences $D_e(i,j)$ and $D_o(i,j)$ at the even number field and odd number field are added to find the sums of absolute differences D(i,j) at the frame. By comparing the sums of absolute differences D(i,j) at the frame, it is possible to find the motion vector MV(x,y) at the frame.

Note that in the above embodiments, the explanation was made of processing for detection of a motion vector in the case of a size of the reference block Bp of 3×4 pixels and 3×4 number of candidate blocks, but the present invention is not limited to these examples. The processing for detection of a motion vector can be realized for any size of reference block so long as the size of the reference block Bp and the number of candidate blocks Bb are made the same.

As explained above, according to the processing circuit of the above embodiments of the present invention, it is possible to use the relationship of the sums of absolute values of differences at the even number field, odd number field, and frame shown in formula (39) to obtain the sums of the absolute differences $D_e(i,j)$ at the even number field, the sums of the absolute differences $D_o(i,j)$ at the odd number field, and the sums of absolute differences D(i,j) at the frame.

Further, in the circuit of the above embodiment, by modifying the pipeline connection (or connection of accumulators), it is possible to perform the calculation of the sums of the absolute differences at the even number field and the calculation of the sums of the absolute differences at the odd number field using the pixel data c of the same candidate block Bp by a single motion vector detection circuit.

Accordingly, according to the processing circuit of the above embodiment, it becomes possible to obtain three types of motion vectors $MV_e(x,y)$, $MV_o(x,y)$, and MV(x,y) at the even number field, odd number field, and frame by a single motion vector detection circuit in the processing for detection of a motion vector for a field and thereby becomes possible to reduce the amount of hardware to approximately ⅓ of that of the circuit configuration mentioned above.

Further, the externally added circuits in the circuit configuration of this embodiment are the same as in the circuit configuration for performing the processing for detection of the motion vector for a frame. Also, the number of ports of the frame memory is not different from that in the circuit configuration in the case of processing for detection of a motion vector for a frame, so it is possible to realize the processing for detection of a motion vector for a field without increasing the number of ports of the frame memory.

As explained above, according to the embodiments of the present invention, in the case of a size of a reference block of M×N and M×N number of candidate blocks, by arranging in an M×N matrix M×N number of processing units having absolute difference processors (or squared difference processors) for calculating the absolute differences between the pixel data of the reference block and the pixel data of the candidate blocks (or squared differences), connecting the outputs of the even number processing units in a pipeline through first adders, connecting the outputs of the odd number processing units in a pipeline by second adders separate from the first adders, and supplying at each processing unit the pixel data of the reference block and the candidate blocks in a certain order to the absolute difference processor (or squared difference processor) or by arranging in an M×N matrix N×N number of processing units for accumulation by an even number and odd number accumulator the absolute differences between the pixel data of the reference block and the pixel data of the candidate blocks (or squared differences) to find the sum of the absolute differences (or sum of the squared differences) and supplying the pixel data of the reference block and the candidate blocks in a certain order, it is made possible to find the sums of the absolute differences in the odd number field, even number field, and frame. Accordingly, the processing circuit of the present invention can reduce the amount of hardware required, can reduce the number of externally added circuits, and can prevent an increase in the number of ports of the frame memory.

THIRD EMBODIMENT

Before explaining a third embodiment of the present invention, an explanation will be made of an interframe predictive encoding circuit 500 to which the processing circuit of the present invention is applied.

Figure 14:
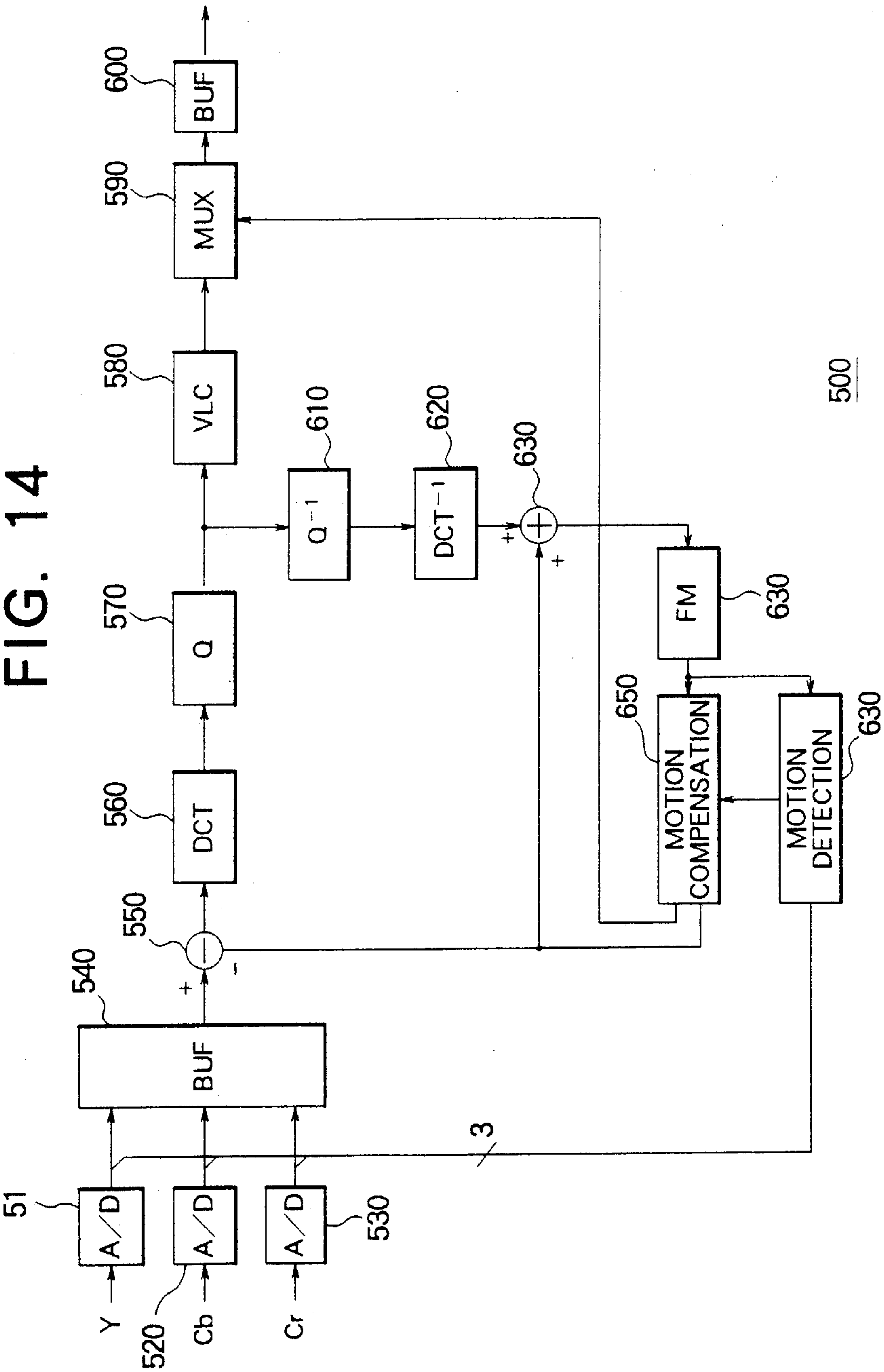
FIG. 14 is a view showing the configuration of an interframe predictive encoding circuit.

FIG. 14 is a view of the configuration of an interframe predictive encoding circuit 500.

The interframe predictive encoding circuit 500 processes the luminance signal Y and the chrominance signals $C_b$ and $C_r$ to first perform motion compensation, then perform discrete cosine transform (DCT) processing and quantization processing to encode the image data subjected to the motion compensation.

Analog/digital converters 510, 520, and 530 convert the luminance signal Y and the chrominance signals $C_b$ and $C_r$ input to signals of a digital format and input the same in a buffer memory 540.

The buffer memory 540 buffers the luminance signal Y and the chrominance signals $C_b$ and $C_r$ after conversion to a digital format at the analog/digital converters 510 to 530 and inputs the same to a subtractor 550.

A subtractor 550 subtracts the image data subjected to motion compensation by a motion compensation circuit 650 from the signals input from the subtractor 540 and inputs the results to a DCT circuit 560.

The DCT circuit 560 performs DCT on the results of the subtraction of the subtractor 550 and inputs the results to a quantization circuit 570.

The quantization circuit 570 quantizes the image data subjected to DCT at the DCT circuit 560 and inputs the results to a variable length coding (VLC) circuit 580 and an inverse quantization circuit 610.

The VLC circuit 580 performs variable length coding on the image data quantized at the quantization circuit 570 and inputs the results to a multiplexer 590.

The multiplexer 590 multiplexes the data of the motion vector input from the motion compensation circuit 650 on the image data subjected to variable length coding by the VLC circuit 580 and inputs the results to a buffer circuit 600.

The buffer circuit 600 performs speed conversion etc. on the encoded image data input from the multiplexer 590 and outputs the results.

An inverse quantization circuit 610 performs inverse quantization on the image data quantized at the quantization circuit 570 and inputs the results to an inverse DCT circuit 620.

The inverse DCT circuit 620 performs inverse DCT on the image data subjected to inverse quantization at the inverse quantization circuit 610 and inputs the results to an adder 630.

The adder 630 adds the image data subjected to inverse DCT by the inverse DCT circuit 620 and the image data subjected to motion compensation by a motion compensation circuit 650 and inputs the results to a frame memory 640.

The frame memory 640 stores the results of addition of the adder 630 in units of frames.

A motion detection circuit 660 detects the motion vector of the image based on all of the luminance signal Y and chrominance signals $C_b$ and $C_r$ converted to a digital format at the analog/digital converter 510 and inputs the results to the motion compensation circuit 650.

The motion compensation circuit 650 performs motion compensation on the image data based on the image data input from the frame memory 640 and the motion vector detected at the motion detection circuit 660, inputs the motion vector data to the multiplexer 590, and inputs the image data subjected to the motion compensation to the subtractor 550.

The processing circuit of the present invention explained in the above embodiments corresponds to the motion detection circuit 660 in the interframe predictive encoding circuit 500 and performs detection based on the luminance signal Y and the chrominance signals $C_r$ and $C_b$ or the three types of color signals R, G, and B.

Below, an explanation will be made of the third embodiment of the present invention.

First, an explanation will be made of the method of detection of a motion vector with consideration to both the luminance signal and the chrominance signals of the pixels as data elements of a color motion picture signal.

For example, an explanation will be made of the processing of a so-called 4:2:2 component signal based on the CCIR.601 recommendation by a processing circuit of the third embodiment of the present invention.

Figure 15:
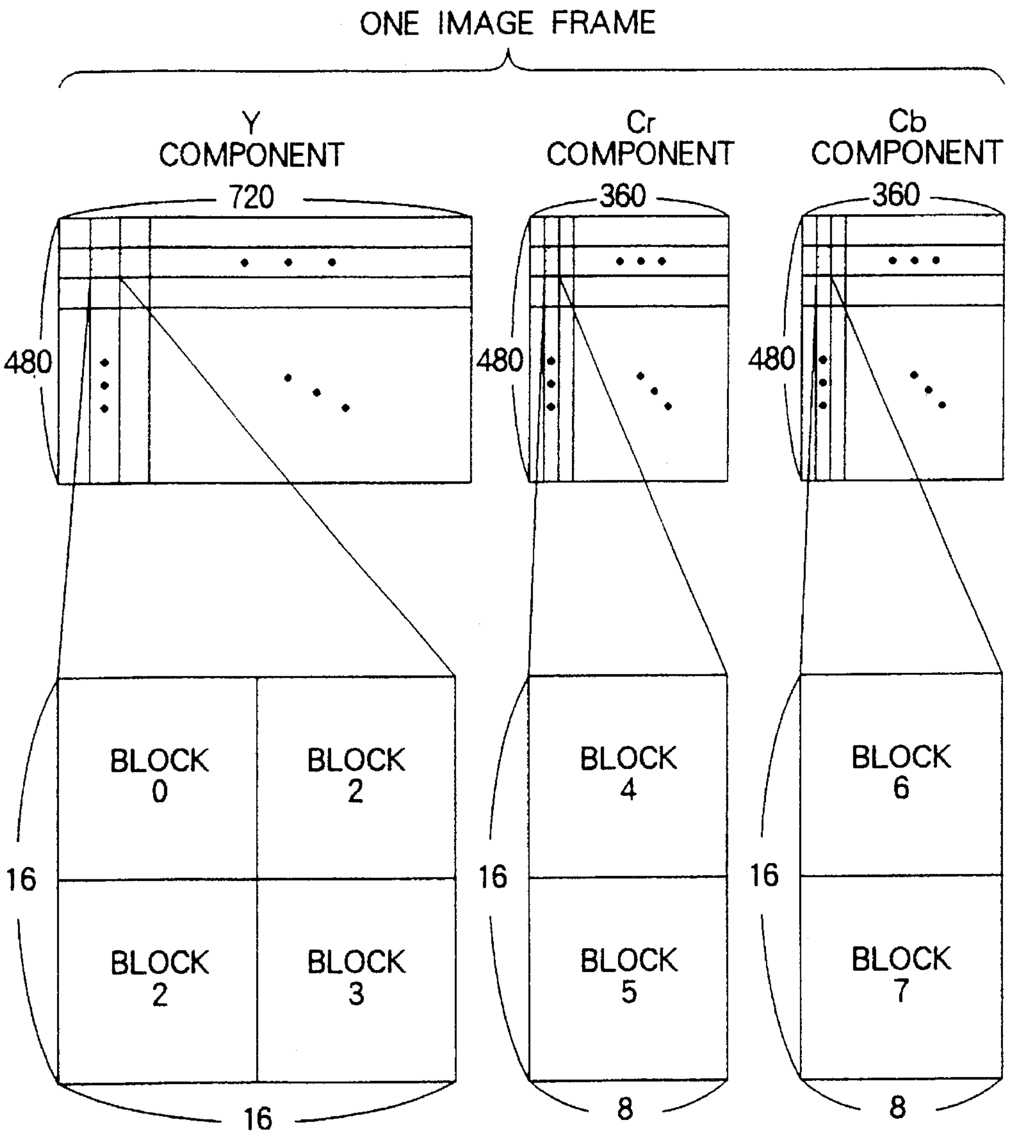
FIG. 15 is a view explaining a so-called 4:2:2 component signal based on the CCIR.601 recommendation.

FIG. 15 is a view explaining the so-called 4:2:2 component signal based on the CCIR.601 recommendation.

As shown in FIG. 15, since what is being processed is a 4:2:2 component signal, the chrominance signals $C_r$ and $C_b$ are thinned to one-half in the x-axial direction. That is, there are 720×480 luminance signals Y (Y component) in one image frame, while there are 360×480 chrominance signals $C_r$ and $C_b$ ($C_r$ component and $C_b$ component).

The luminance signals Y are processed in units of blocks of 8×8 pixels and macro-blocks comprising four such blocks, as shown in FIG. 15.

The chrominance signals $C_r$ and $C_b$ are processed in units of blocks of 8×8 pixels and macro-blocks comprising two such blocks, as shown in FIG. 15.

That is, the motion vectors are detected by performing the processing of the following formula on the motion picture signal for each of the plurality of data elements (component signals) of the motion picture signal, for example, the luminance signal Y and the chrominance signals $C_r$ and $C_b$.

Note that in the following formula, the sum of the evaluation values of the differences is not the sum of the squared differences, but the sum of the absolute differences:

$$D(i,j) = \sum_{m=0}^{M-1} \sum_{n=0}^{N-1} |RefY(m,n) - C \text{ and } Y(m+i,n+j)| + Wcb \sum_{m=0}^{M/2-1} \sum_{n=0}^{N-1} |RefCb(m,n) - C \text{ and } Cb(m+[i/2],n+j) + Wcr \sum_{m=0}^{M/2-1} \sum_{n=0}^{N-1} |RefCr(m,n) - C \text{ and } Cr(m+[i/2],n+j) \tag{40}$$

where,

0≦i<K, 0≦j<L and [i/2] indicates a modulus of i/2, that is, the maximum integer of not more than i/2.

$$MN(x,y) = \min_{i,j} D(i,j) \tag{41}$$

However, in formula (40), M×N (pixels) indicates the size of the reference block, K×L (pixels) indicates the search range (number of candidate blocks) in the previous frame, RefY(x,y) indicates the luminance signal component of the pixels of the reference block, CandY(x,y) indicates the luminance signal component of the pixels of the candidate blocks, $RefC_b(x,y)$ and $RefC_r(x,y)$ indicate the chrominance signal components of the reference block, $CandC_b(x,y)$ and $CandC_r(x,y)$ indicate the chrominance signal components of the candidate blocks, and $wc_b$ and $wc_r$ are weighting coefficients for changing the degree of consideration of the chrominance signals $C_r$ and $C_b$.

Further, the MV(x,y) in formula (41) indicates the motion vector of the reference block, and minD(i,j) indicates the vector giving the smallest value of the sum of the absolute differences of the luminance signal Y and the chrominance signals $C_r$ and $C_b$.

As shown in formula (41), the motion vector MV(x,y) is equal to the vector minD(i,j) obtained by subtracting from the coordinates of predetermined pixels of the candidate block giving the smallest sum of absolute values of differences the coordinates of the corresponding pixels of the reference block.

The above processing is performed for all reference blocks in the current frame.

Below, an explanation will be made of the processing circuit 110 for detecting the motion vector according to the present invention.

Figure 16:
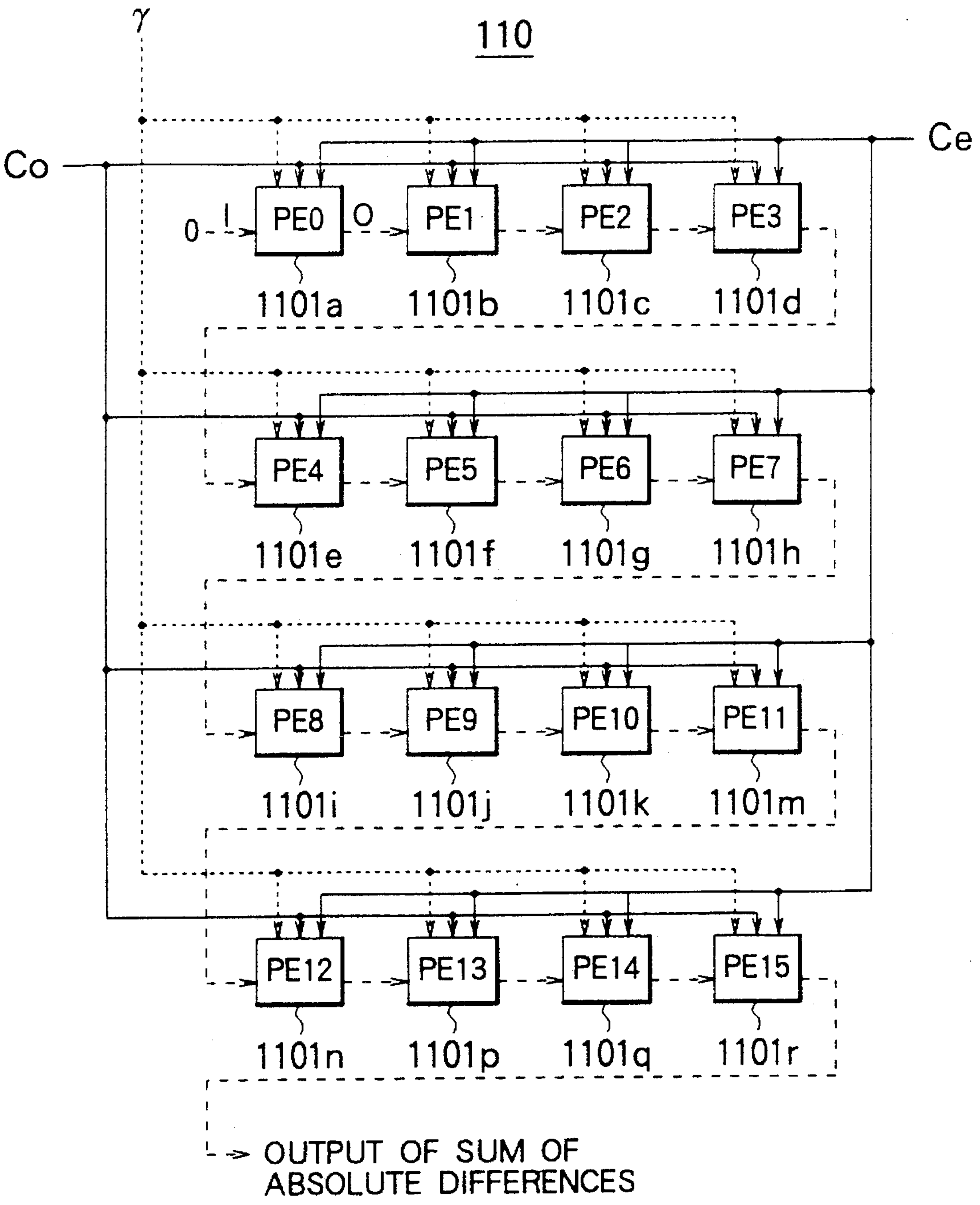
FIG. 16 is a view showing the configuration of a processing circuit according to a third embodiment of the present invention.

FIG. 16 is a view showing the configuration of a processing circuit according to the third embodiment of the present invention.

The processing circuit 110 detects a motion vector based on the block-matching method with respect to the object of the motion vector. That is, a reference block of a current frame comprised of, for example, 4×4 pixels is block-matched with the same number of candidate blocks of the previous frame.

As shown in FIG. 22, when detecting a motion vector by shifting the 4×4 pixel reference block one pixel at a time in the vertical and horizontal directions, if the processing for detection of the motion vector is performed for the range of 7×7 pixels in the previous frame, then the search would be carried out for all of the 16 candidate blocks having 4×4 pixels.

In FIG. 16, the processing units 1101*a* to 1101*r* (PE1 to PE15), the exact same number as the pixels comprising the reference block of the color motion picture data, are provided in a 4×4 matrix. They successively calculate the absolute differences of the luminance signal Y and the chrominance signals $C_r$ and $C_b$ (pixel data r) of the reference block and the luminance signal Y and chrominance signals $C_r$ and $C_b$ (pixel data c of previous frame) of the candidate blocks. The processing units 1101*a* to 1101*r* as a whole successively calculate the sums of the absolute differences of the reference block and the candidate blocks.

The processing circuit 110 receives at the processing units 1101*a* to 1101*r* the pixel data r of the corresponding pixels of the reference block and the pixel data c̲ of the even number columns and odd number columns of the candidate blocks. These processing units 1101 calculate the absolute differences between the pixel data r̲ and pixel data c̲.

Here, a column means a unit of pixels in the vertical direction. For example, in the block shown in FIG. 22A and 22B, the even number columns of the luminance signal (Y) are (a, b, c, d), (i, j, k, l), . . . and the odd number columns are (e, f, g, h), (m, n, o, p), . . .

Further, the even number columns of the chrominance signals $C_r$ and $C_b$ are (a, b, c, d), (1', b', c', d', . . . and the odd number columns are (e, f, g, h), (e', f', g', h'), . . .

The absolute values calculated at the processing units 1101*a* to 1101*r* are successively added to the input values input from the prior stage processing units 1101. The sum of the absolute differences of the pixel data r̲ and pixel data c̲ is output from the final-stage processing unit 1101*r*.

The candidate block giving the smallest sum of the absolute values is the candidate block with the strongest resemblance to the reference block. By judging the output value of the processing unit 1101*r*, it is possible to detect the candidate block with the strongest resemblance and possible to detect the motion vector corresponding to the reference vector based on this candidate block.

A predetermined fixed value, however, for example, the numerical value "0", is input as the input value of the first-stage processing unit 1101*a*.

Figure 17A:
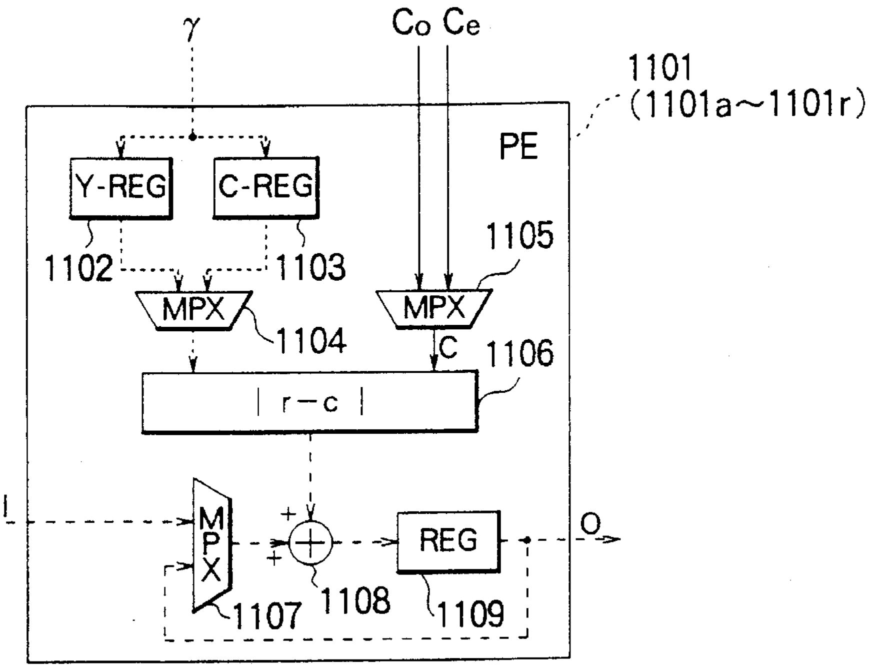
FIGS. 17A and 17B are views showing configurations of the processing unit shown in FIG. 16.
Figure 17B:
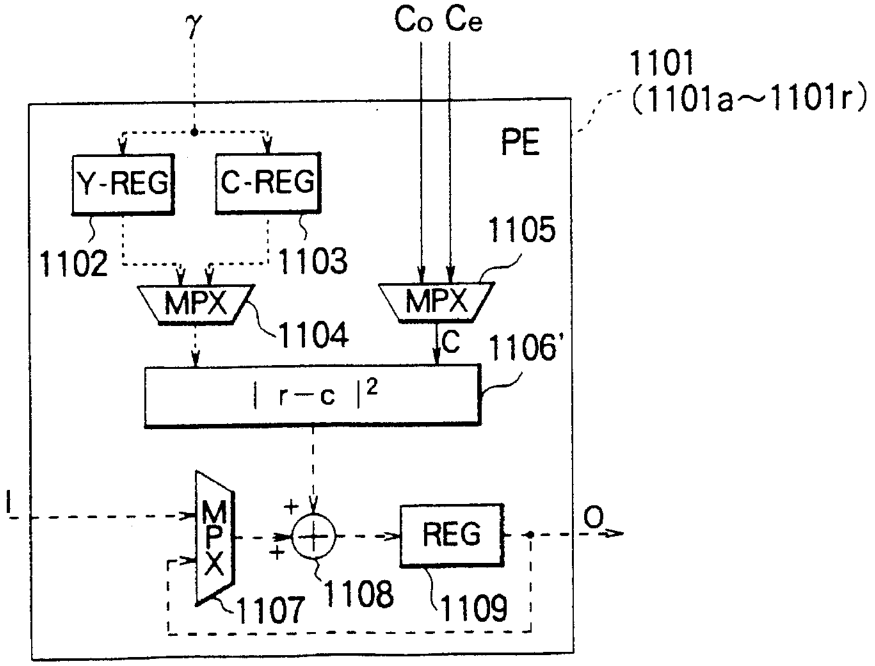

FIGS. 17A and 17B are views showing configurations of a processing unit 1101 shown in FIG. 16.

The processing units 1101*a* to 1101*r* shown in FIG. 16 have identical configurations.

In FIGS. 17A and 17B, the luminance signal register (Y-REG) 1102 stores the luminance signal Y among the plurality of data elements (component signals) of the corresponding pixels of the reference block for 32 clock cycles.

The chrominance signal register (C-REG) 1103 stores the chrominance signals $C_r$ and $C_b$ among the plurality of data elements (component signals) of the corresponding pixels of the reference block for 32 clock cycles.

As explained above, in a 4:2:2 component signal, the chrominance signals are thinned to one-half, so the chrominance signal $C_r$ or the chrominance signal $C_b$ is stored in the chrominance signal register 1103.

The multiplexer 1104 selects one of the output signals of the luminance signal register 1102 or chrominance signal register 1103 and inputs the same to the absolute difference processor (|r−c|) 1106.

The multiplexer 1105 operates in association with the multiplexer 1104 and selects one of the odd number column pixel data $c_o$ or even number column pixel data $c_e$ of the candidate blocks input and inputs the same to the absolute difference processor 1106.

For example, when processing the pixel data $c_e$ of the even number column pixels of a candidate block, the multiplexer 1105 selects the signal from the even side input shown in FIGS. 17A and 17B, while the multiplexer 1104 selects and outputs the input of the luminance signal register 1102 side while the luminance signal Y is output to the pixel data c̲ output from the multiplexer 1105.

Conversely, in this case, when the chrominance signal $C_b$ or the chrominance signal $C_r$ is output from the multiplexer 1105 to the pixel data c̲, the multiplexer 1104 selects and outputs the input of the chrominance signal register 1103 side.

On the other hand, when processing the pixel data $c_o$ of the odd number column pixels of a candidate block, the multiplexer 1105 selects the signal from the odd side input shown in FIGS. 17A and 17B, while the multiplexer 1104 selects and outputs the input of the luminance signal register 1102 side while the luminance signal Y is output to the pixel data c̲ output from the multiplexer 1105.

Conversely, in this case, when the chrominance signal $C_r$ or the chrominance signal $C_b$ is output from the multiplexer 1105 to the pixel data c̲, the multiplexer 1104 selects and outputs the input of the chrominance signal register 1103 side.

The absolute difference processor 1106 changes the signs of the differences of the input signals from the multiplexers 1104 and 1105 to positive, calculates the absolute differences, and inputs the results to the adder 1108.

Note that the absolute difference processor 1106 may for example change the signs of the absolute values to negative or may calculate the squared differences 1106' to meet with modifications made in the overall configuration of the processing circuit 110.

The multiplexer 1107 selects one of the output signal of the register 1109 or the input value from the previous stage and inputs the same to the adder 1108.

The adder 1108 adds the input signal from the multiplexer 1107 and the absolute differences calculated at the absolute difference processor 1106.

The multiplexer 1107, the adder 1108, and the register 1109 constitute a circuit for calculating the accumulated value of the absolute differences. For example, when the absolute differences of the luminance signal Y is calculated in advance in the absolute difference processor 1106, the multiplexer 1107 first selects and outputs the input value (I) side from the previous stage.

The adder 1108 adds the absolute differences of the luminance signal with the input value from the previous stage and temporarily stores the result in the register 1109.

Next, when the absolute differences of the chrominance signals $C_r$ and $C_b$ of the same pixel are calculated in the absolute difference processor 1106, the multiplexer 1107 selects the input from the register 1109.

The adder 1108 adds the absolute differences of the chrominance signals $C_r$ and $C_b$ with the signal input from the multiplexer 1107 and stores the result in the register 1109.

The values of the signals stored in the register 1109 are input to the next stage as the output values.

That is, the processing units 1101*a* to 1101*r* are connected in a pipeline and calculate and accumulate the absolute differences of the data elements of the pixel data c and r which are successively input.

As a result, the output signal of the final stage processing unit 1101*r* becomes the sum of the absolute differences of the data elements of the pixels of the reference block and the pixels of a given candidate block.

Next, an explanation will be made of the operation of the processing circuit 1101.

The processing circuit 110 performs processing of the following formula.

The following formula is successively executed by successively changing the pixel data r and c input to the processing units 1101*a* to 1101*r*. The sum of the absolute differences of the data elements among the corresponding pixels of the candidate blocks and the reference block is output as serial data from the processing unit 1101*r*.

$$D(i,j) = \sum_{m=0}^{15}\sum_{n=0}^{15} |RefY(m,n) - C \text{ and } Y(m+i,n+j)| + \sum_{m=0}^{7}\sum_{n=0}^{15} |RefCb(m,n) - C \text{ and } Cb(m+[i/2],n+j)| + \sum_{m=0}^{7}\sum_{n=0}^{15} |RefCr(m,n) - C \text{ and } Cr(m+[i/2],n+j)| \quad (42)$$

where, $0 \leq i < K$, $0 \leq j < L$ and [i/2] indicates the maximum integer of not less than i/2. a modulus of i/2, that is, $$MV(x,y) = \min_{i,j} D(i,j) \quad (43)$$

Here, the MV(x,y) in formula (43) indicates the motion vector of the reference block, and minD(i,j) indicates the vector giving the smallest value of the sum of the absolute differences of the luminance signal Y and the chrominance signals $C_r$ and $C_b$.

As shown in formula (43), the motion vector MV(x,y) is equal to the vector minD(i,j) obtained by subtracting from the coordinates of predetermined pixels of the candidate block giving the smallest sum of absolute differences the coordinates of the corresponding pixels of the reference block.

As shown in the above formula, the processing circuit 110 uses the units of macro-blocks shown in FIG. 15 as the reference block and the candidate blocks.

Here, for simplification of the explanation, the reference block and the candidate blocks are made 4×4 pixels corresponding to the processing circuits 1101*a* to 1101*r*.

Further, as shown in formula (42), for simplification of the hardware, the numerical values $wc_r$ and $wc_b$ shown in formula (40) will both be made 1 and, further, some changes will be made to the consideration of the chrominance signal $C_b$.

Even if the above mentioned method, wherein formula (40) is modified, is used for processing for detection of the motion vector, it is possible to tremendously improve the compression efficiency of the motion picture data after compensation by the motion vector compared with the conventional method of detection of a motion vector which processes only the luminance signal.

FOURTH EMBODIMENT

Below, an explanation will be made of a fourth embodiment of the present invention.

The processing circuit 120 according to the fourth embodiment is a modification of the first embodiment and is comprised of the processing units 1201*a* to 1201*r* instead of the processing units 1101*a* to 1101*r*, which calculate the sums of the absolute differences of the data elements of the corresponding pixels of the reference block and the candidate blocks.

Figure 18:
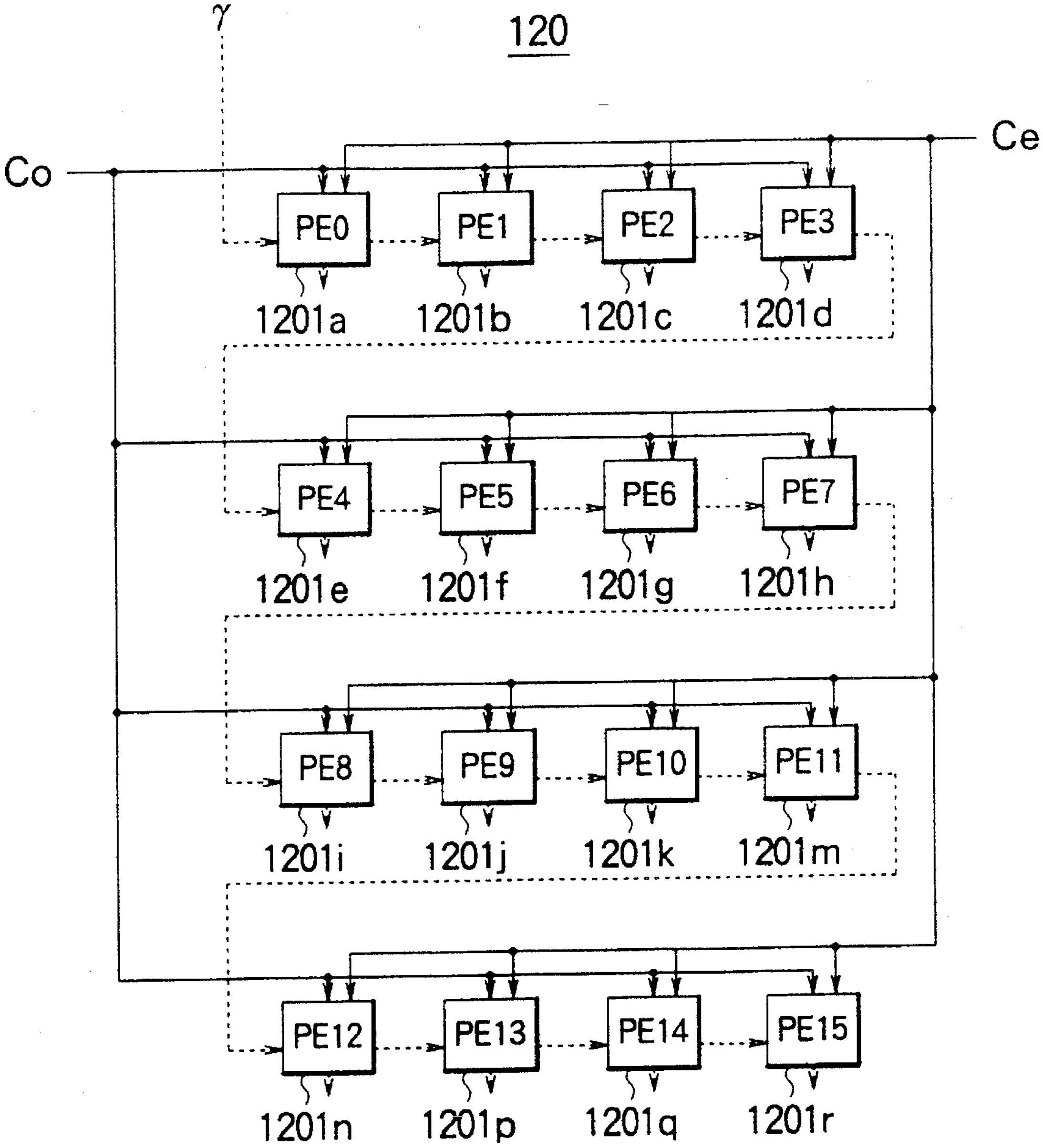
FIG. 18 are views of the configuration of a processing circuit according to a fourth embodiment of the present invention.

FIG. 18 is a view showing the configuration of the processing circuit 120 of the fourth embodiment of the present invention. The processing units 1201*a* to 1201*r* of the processing circuit 120 receive in parallel the pixel data c in the same way as the processing units 1101*a* to 1101*r* of the processing circuit 110, but the pixel data r are successively input in series to the processing units 1201*a* to 1201*r*. That is, the pixel data r are successively sent to the next stage each clock cycle of the processing circuit 120.

Figure 19A:
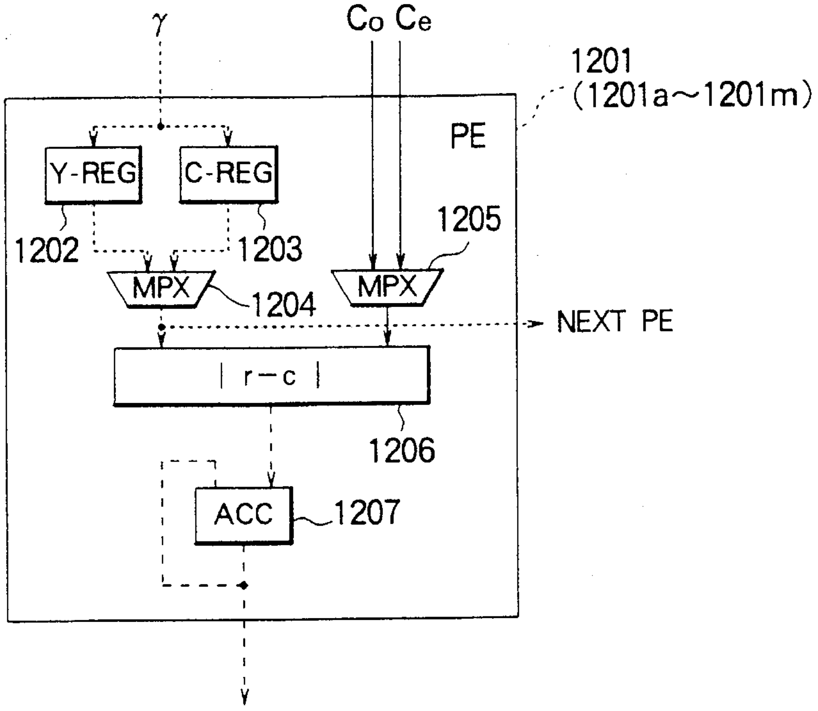
FIGS. 19A and 19B are views showing configurations of the processing unit shown in FIG. 18.
Figure 19B:
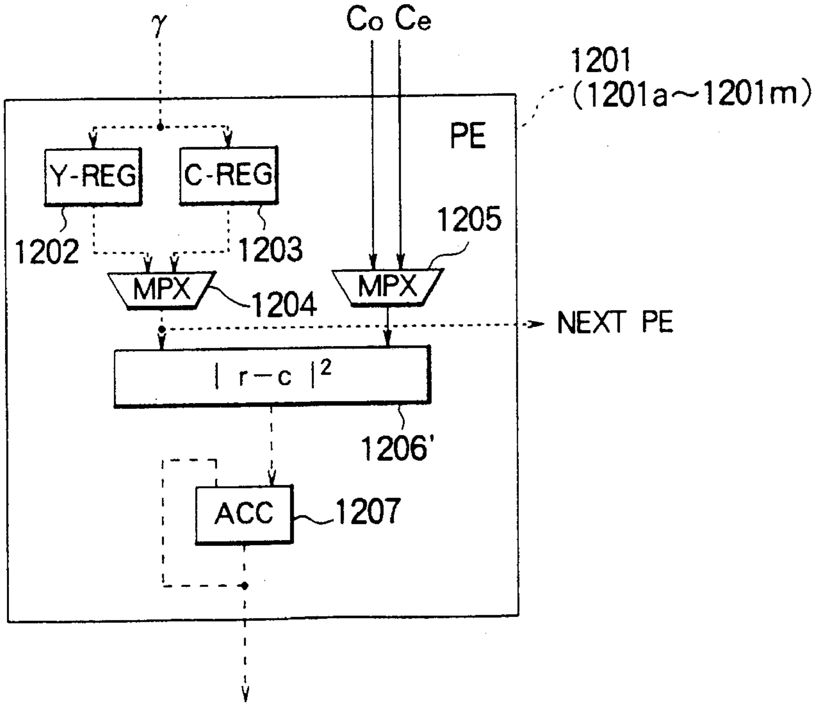

FIGS. 19A and 19B are views of configurations of a processing unit 1201 shown in FIG. 18.

In FIGS. 19A and 19B, the luminance signal register 1202, the chrominance signal register 1203, the multiplexers 1204 and 1205, and the absolute difference processor 1206 are the same as the corresponding portions of a processing unit 1101.

The accumulator 1207 accumulates the absolute differences of the data elements input from the absolute difference processor 1206.

The processing units 1201*a* to 1201*b* are comprised so as to input the output signals of the multiplexer 1204 as the next stage pixel data r.

The processing units 1202*a* to 1202*r* of the processing circuit 120 successively receive the pixel data r each clock cycle as explained above, calculate the absolute differences with the data elements of the pixel data c successively input in a suitable order in the absolute difference processors 1206, and calculate the accumulated values of the absolute values in the accumulators 1207.

The accumulated values become the sums of the absolute differences of the data elements of the reference block and the corresponding candidate blocks after 16 clock cycles from the input of the valid pixel data 4 in the processing circuits 1202*a* to 1202*r*.

Accordingly, the processing circuit 120 can also substantially process formula (42) and has a similar function as the processing circuit 110.

FIFTH EMBODIMENT

Below, an explanation will be given of a fifth embodiment of the present invention.

Figure 20:
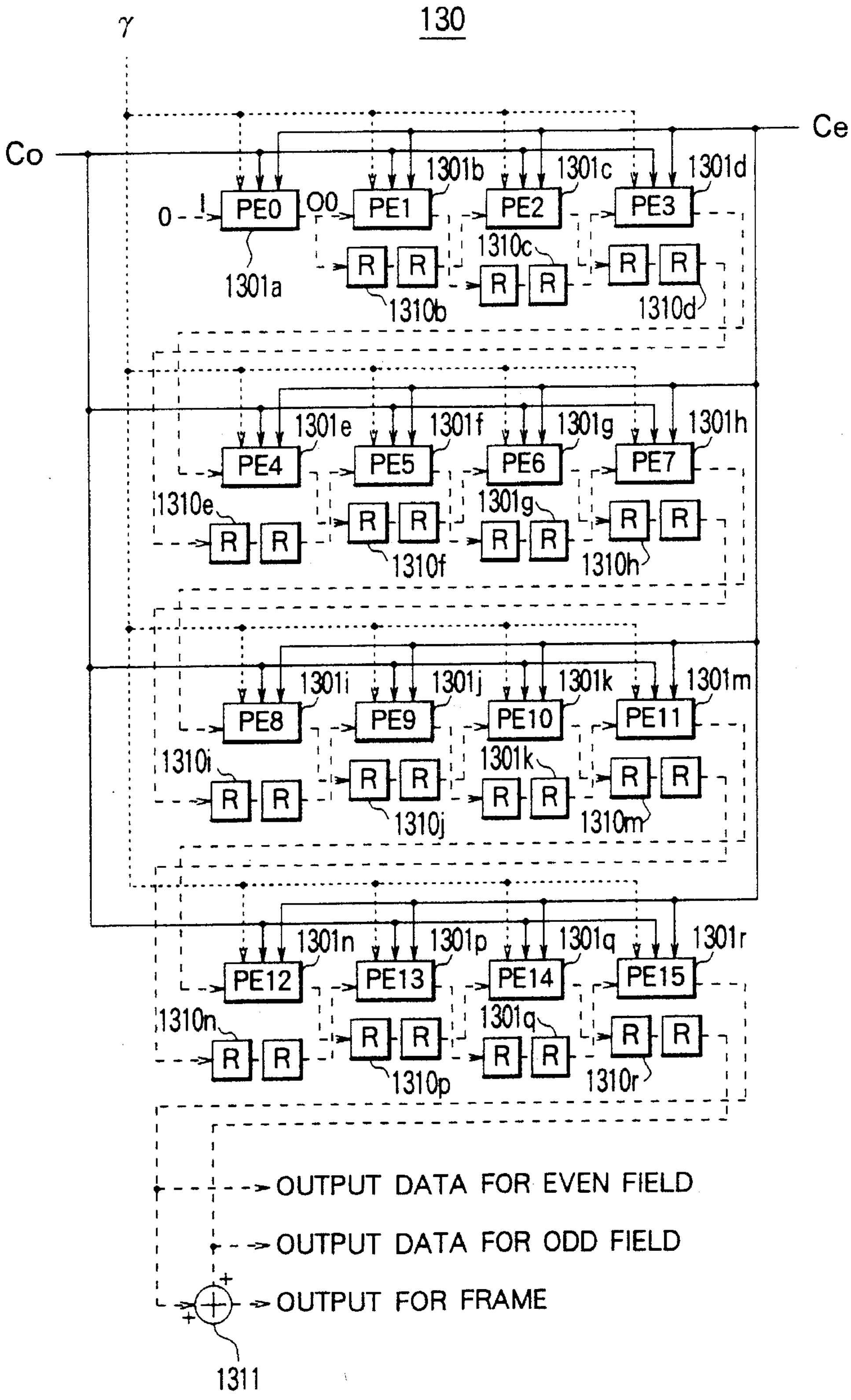
FIG. 20 is a view showing the configuration of a processing circuit according to a fifth embodiment of the present invention.
Figure 21A:
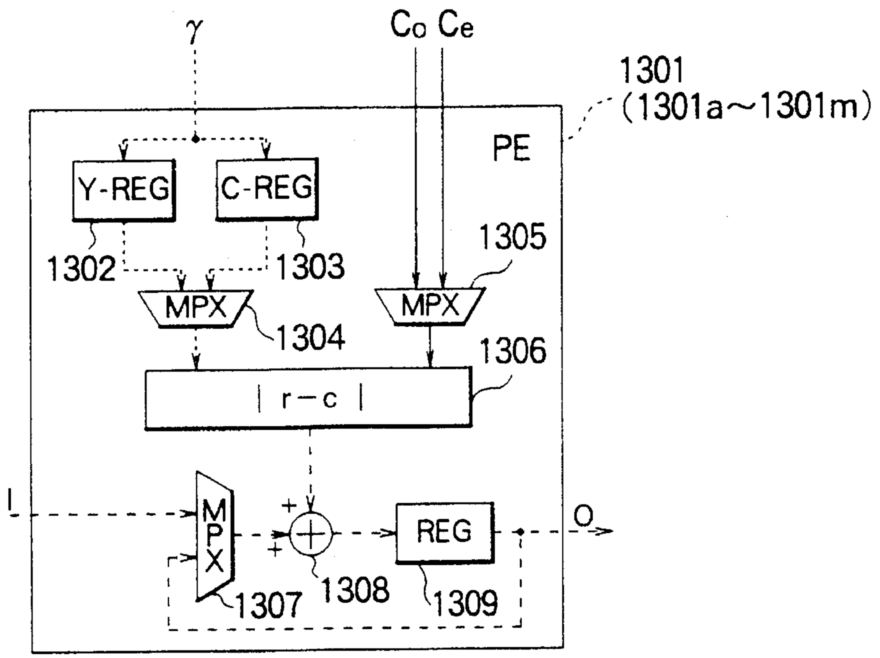
FIGS. 21A and 21B are views showing configurations of the processing unit shown in FIG. 20.
Figure 21B:
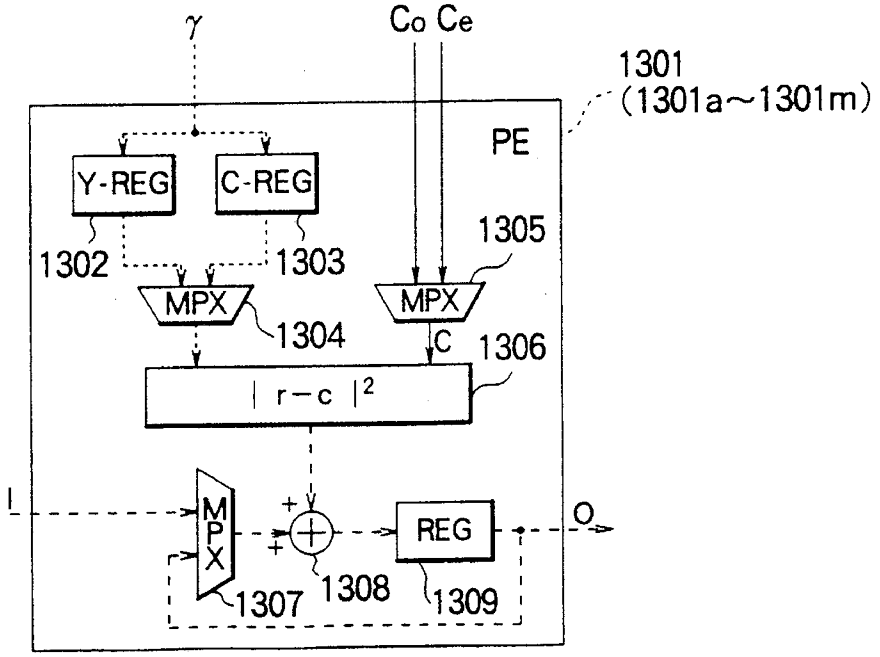

FIG. 20 is a view showing the configuration of a processing circuit 130 of the fifth embodiment of the present invention. FIG. 21 are views showing configurations of a processing unit 1301 shown in FIG. 20.

In FIG. 20, the processing units 1301*a* to 1301*r* are arranged in a 4×4 matrix. As shown in FIG. 21, they have identical configurations and identical operations as the processing units 1101 explained in the third embodiment.

The portions of the processing units 1301 are the same as the portions of the corresponding processing units 1101.

The registers 1310*b* to 1310*r* are comprised by two registers, connected in series, giving a delay of 1 clock cycle of the processing units 1301 to the input signals. They give a delay of two clock cycles to the output signals of the processing units 1301*a* to 1301*q* and input the results to the next stage.

The processing circuit 130 is comprised of processing units 1301*a* to 1301*r* of the same configuration as the processing units 1101 explained in the third embodiment connected in two systems through registers 1310*b* to 1310*r* for each of the same. "0" is input as an input value to the first stage processing units 1301*a* and 1301*b* of each system.

That is, as the first system, the processing units 1301*a*, 1301*c*, 1301*e* to 1301*q* are connected in a pipeline through the registers 1310*b*, 1310*d*, 1310*f* to 1310*p*. Finally, the sums of the absolute differences for the odd number field are output to the register 1310.

Further, as the second system, the processing units 1301*b*, 1301*d*, 1301*f* to 1301*r* are connected in a pipeline through the registers 1310*c*, 1310*e*, 1310*g* to 13101. Finally, the sums of the absolute differences $D_e(i,j)$ of the even number field are output Further, the sums of the absolute differences $D_e(i,j)$ of the even number field and the sum of the absolute differences $D_o(i,j)$ of the odd number field are added at the adder 311 and output as the sums of absolute differences D(i,j) of the frame.

The processing circuit 130 finds the motion vector $MV_e(x,y)$ of the even number field, the motion vector $MV_o(x,y)$ of the odd number field, and the motion vector MV(x,y) of the frame by finding the smallest values of the sums of the absolute differences $D_e(i,j)$ of the even number field, the sums of the absolute differences $D_o(i,j)$ of the odd number field, and the sums of absolute differences D(i,j) of the frame found as explained above.

That is, the following relationship stands among the sums of absolute differences $D_e(i,j)$ at the even number field, the sums of absolute differences $D_o(i,j)$ at the odd number field, and the sums of absolute differences D(i,j) at the frame:

$$D(i,j)=De(i,j)+Do(i,j)\ 0\leqq i\leqq 3,\ 0\leqq j\leqq 3 \quad (44)$$

Note that while illustration was omitted, the processing circuit 130 is further provided with memories for storing the sums of the absolute differences $D_e(i,j)$ of the even number field, the sums of the absolute differences $D_o(i,j)$ of the odd number field, added by the adder 1311, and the sums of absolute differences D(i,j) of the frame. The motion vector $MV_e(x,y)$ of the even number field, the motion vector $MV_o(x,y)$ of the odd number field, and the motion vector MV(x,y) of the frame are found from the numerical values stored in these memories.

Below, an explanation will be made of the operation of the processing circuit 130 referring to FIGS. 22A and 22B and FIG. 23.

Figure 22A:
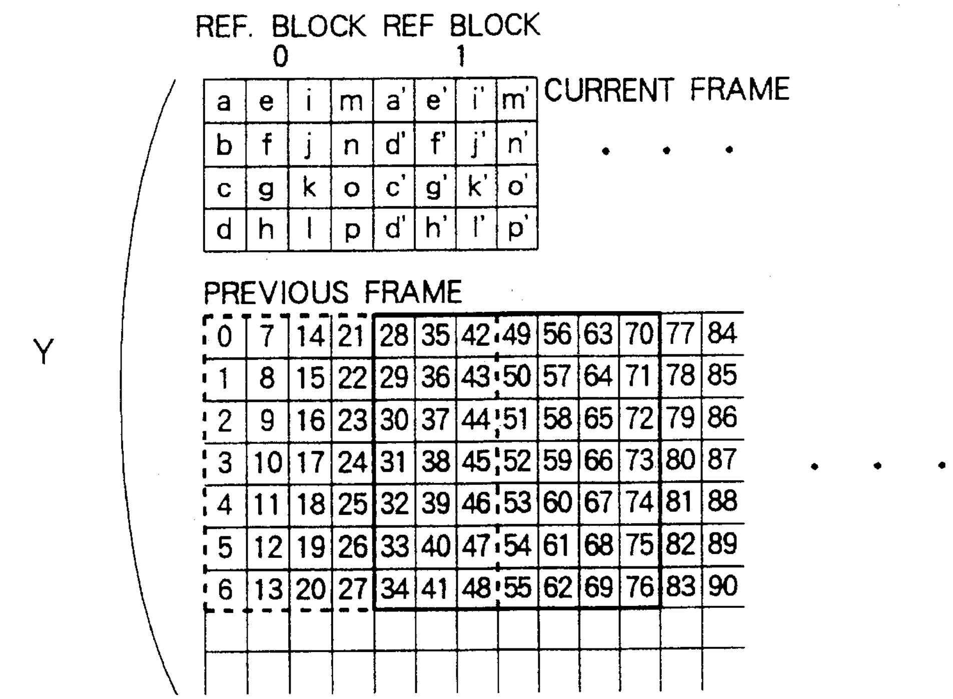
Figure 22B:
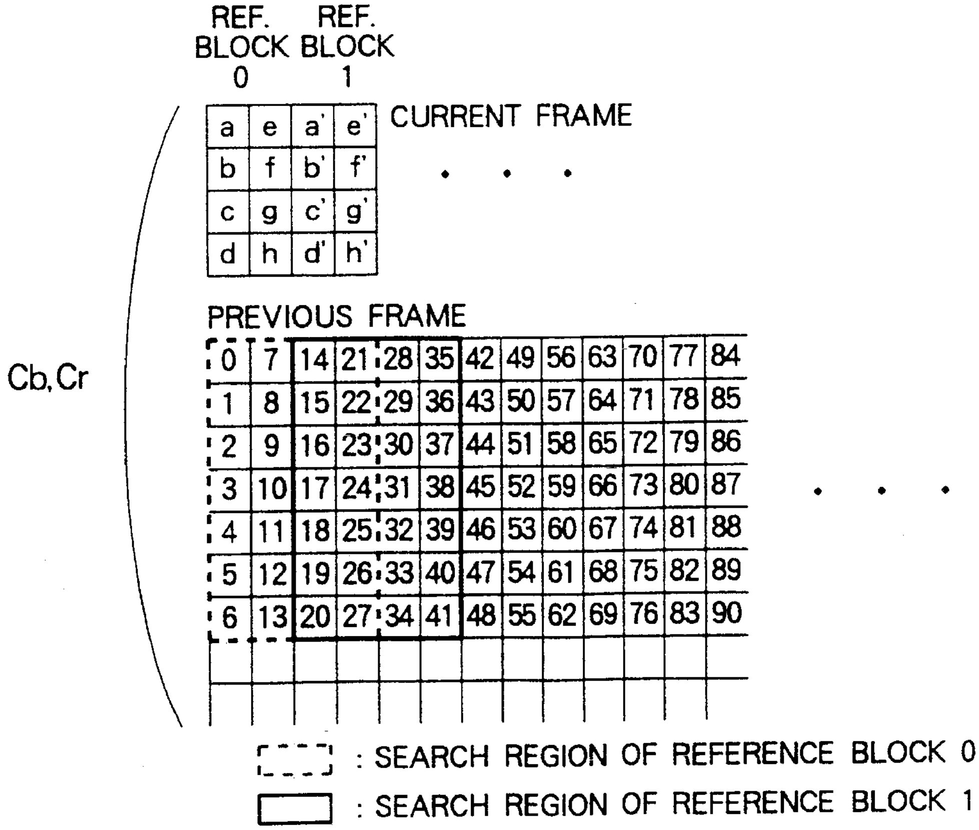

FIGS. 22A and 22B are views for explaining the operation for detection of a motion vector.

FIG. 22A, in particular, shows a reference block and candidate blocks of a luminance signal Y component, while FIG. 22B shows a reference block and candidate blocks of a chrominance signal $C_r$ and $C_b$ component.

As shown in FIG. 15, the chrominance signals $C_r$ and $C_b$ of the 4:2:2 component signal are thinned in half in the x-axial direction, so compared with the reference block and candidate blocks of the luminance signal Y, the reference block and candidate blocks of the chrominance signals $C_r$ and $C_b$ become half the size in the x-axial direction.

The correspondence between the reference block and the candidate blocks is shown in FIGS. 22A and 22B.

Note that in FIGS. 22A and 22B, for purposes of simplification of the explanation, the macro-block is made 4×4 for the luminance signal Y and 2×4 for the chrominance signals $C_r$ and $C_b$.

Figure 23:
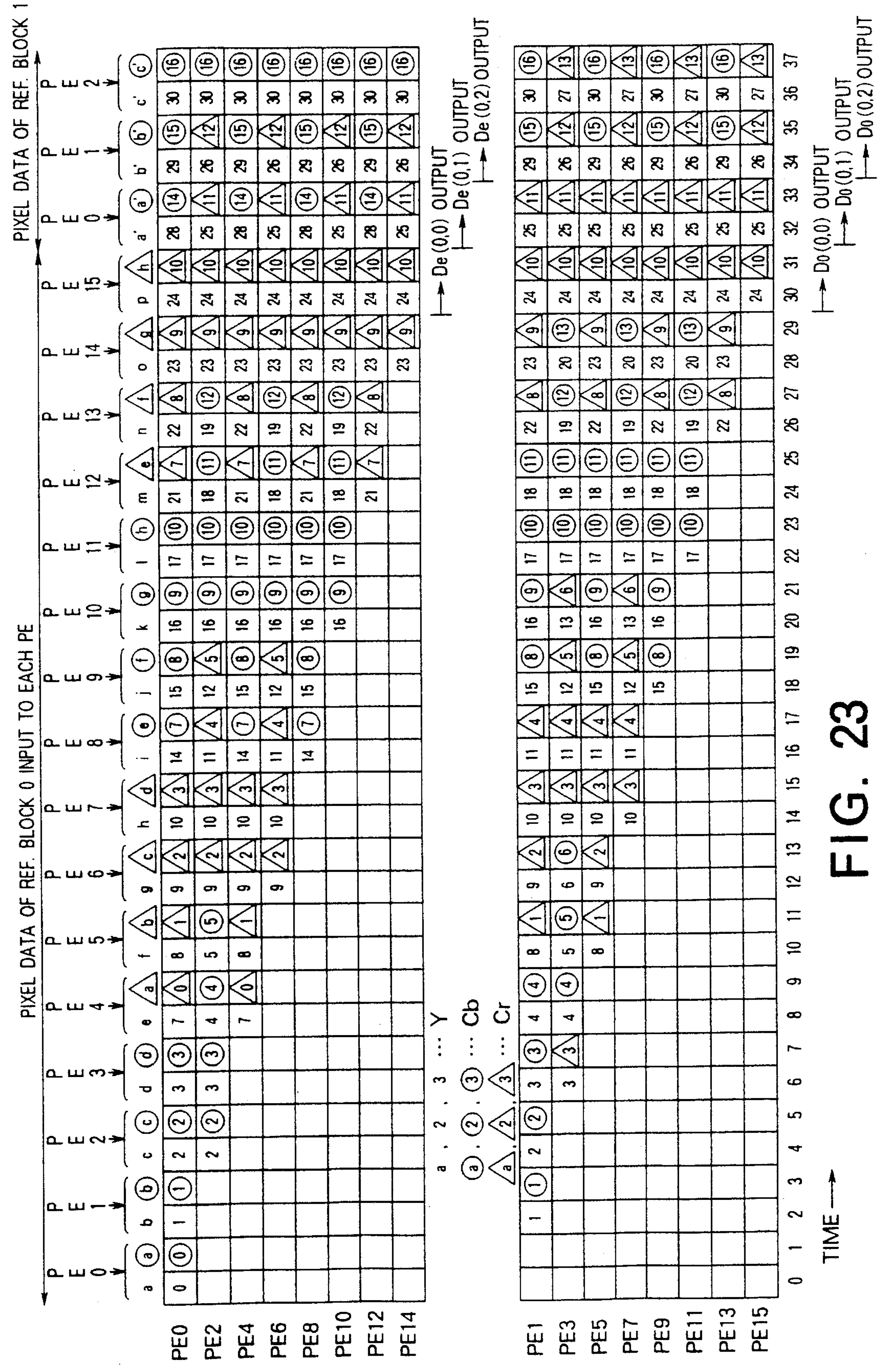
FIG. 23 is a view for explaining the pixel data processed by the processing units of the processing circuit shown in FIG. 20 and the timing of the same.

FIG. 23 is a view for explaining the pixel data processed by the processing units 1301*a* to 1301*r* of the processing circuit 130 shown in FIG. 20 and the timing of the processing.

In FIG. 23, unmarked a to p show the luminance signal (Y) components of the pixel elements of the reference block of the current frame shown in FIG. 22A, while the unmarked numerals show the luminance signal (Y) components of the candidate blocks of the previous frame shown in FIG. 22A.

Further, in FIG. 23, the circled a to h show the chrominance signal ($C_b$) components of the pixel elements of the reference block of the current frame shown in FIG. 22B, while the circled numerals show the chrominance signal ($C_b$) components of the candidate blocks of the previous frame shown in FIG. 22B.

Further, in FIG. 23, the triangle-enclosed a to h show the chrominance signal ($C_r$) components of the pixel elements of the reference block of the current frame shown in FIG. 22B, while the triangle-enclosed numerals show the chrominance signal ($C_r$) components of the candidate blocks of the previous frame shown in FIG. 22B.

As shown in FIG. 23, a set of the luminance signal Y and chrominance signals $C_r$ and $C_b$ of the pixel data r of the pixels of the reference block is input to each of the processing units 1301*a* to 1301*r* every two clock signals.

That is, as explained above, the pixel data r are comprised of signals of the form of the luminance signal Y and chrominance signals $C_r$ and $C_b$ of the pixels of the reference block alternately multiplexed and are stored in the luminance signal register 1302 and chrominance signal register 1303 every clock cycle.

The luminance signal register 1302 and the chrominance signal register 1303 store the input luminance signal Y and chrominance signals $C_r$ and $C_b$ for 32 clock cycles. On the other hand, the chrominance signal registers 1303*a* to 1303*r* receive the pixel data c with every two clock cycles. Accordingly, the processing units 1301*a* to 1301*r* use the same pixel data r for a period of 32 clock cycles so as to successively process a set of pixel data c every two clock cycles, that is, the luminance signal Y or chrominance signals $C_r$ and $C_b$ of the same pixel data c every clock cycle.

Further, the multiplexer 1305 alternately selects the luminance signal Y and chrominance signals $C_r$ and $C_b$ every clock cycle and inputs the same in the absolute difference processor 1306 so that the pixel data c are input in the order shown in FIG. 23.

The multiplexer 1304 alternately selects the luminance signal Y and chrominance signals $C_r$ and $C_b$ every clock cycle and inputs the same in the absolute difference processor 1306.

The absolute difference processor 1306 calculates the absolute differences of the same types of signal elements (luminance signal Y and chrominance signals $C_r$ and $C_b$) of the pixel data r and pixel data c input every clock cycle.

By the above processing, processing is performed on at most two pixel data in a given clock cycle of the processing units 1301*a* to 1301*r*.

The absolute differences of the signal elements of the pixel data c and pixel data r calculated at the absolute difference processor 1306 are added to the input values (I) by the accumulator comprised of the multiplexer 1307, adder 1308, and register 1309 and the results input to the registers 1310*b* to 1310*r*.

That is, as explained above, when the absolute differences of the luminance signal Y of the pixel data c and pixel data r are calculated, the multiplexer 1307 selects the input value (I) and inputs the values to the adder 1308, where they are added with the output signals of the absolute difference processor 1306 and the results stored in the register 1309.

Next, when the absolute differences of the chrominance signals $C_r$ and $C_b$ of the pixel data c and pixel data r are calculated, the multiplexer 1307 selects the output (O) of the register 1309 and inputs the values to the adder 1308, where they are added with the output signals of the absolute difference processor 1306 and the results stored in the register 1309.

The results of addition stored in the register 1309 are successively stored in the luminance signal registers 1302*b* to 1302*r* every clock cycle where they are given a delay of two clock cycles and then are input to the next stage processing units 1301*c* to 1301*r* or are output to the even number and odd number field outputs.

That is, by using the registers 1310*b* to 1310*r* to delay the input of the results of the addition to the next stage for the time for the processing units 1301*c* to 1301*r* to process one set of pixel data c, the first system comprised of the processing units 1301*a*, 1301*c* to 1301*q* and the processing units 1301*b*, 1301*d* to 1301*r* is used to calculate the sum of the absolute differences $D_e(i,j)$ of the even number field and the second system comprised of the processing units 1301*b*, 1301*d* to 1301*r* and the processing units 1301*c*, 1301*e* to 1301*d* is used to calculate the sum of the absolute differences $D_o(i,j)$ of the odd number field.

The sums of the absolute differences of the odd number field and even number field are added by the adder 311 to give the sum of absolute differences D(i,j) of the frame.

By the operation of the processing circuit 130 explained above, it becomes possible to find three types of signals, i.e., the sum of the absolute differences $D_e(i,j)$ and sum of the absolute differences $D_o(i,j)$ for even and odd number fields and the sum of absolute differences D(i,j) for the frame every two clock cycles.

Accordingly, a processing circuit for which the processing circuit 130 is used can detect the motion vectors for each of these three types of signals and can perform compression, encoding, and other processing using these vectors.

SIXTH EMBODIMENT explanation will be made of a sixth embodiment below.

Figure 24:
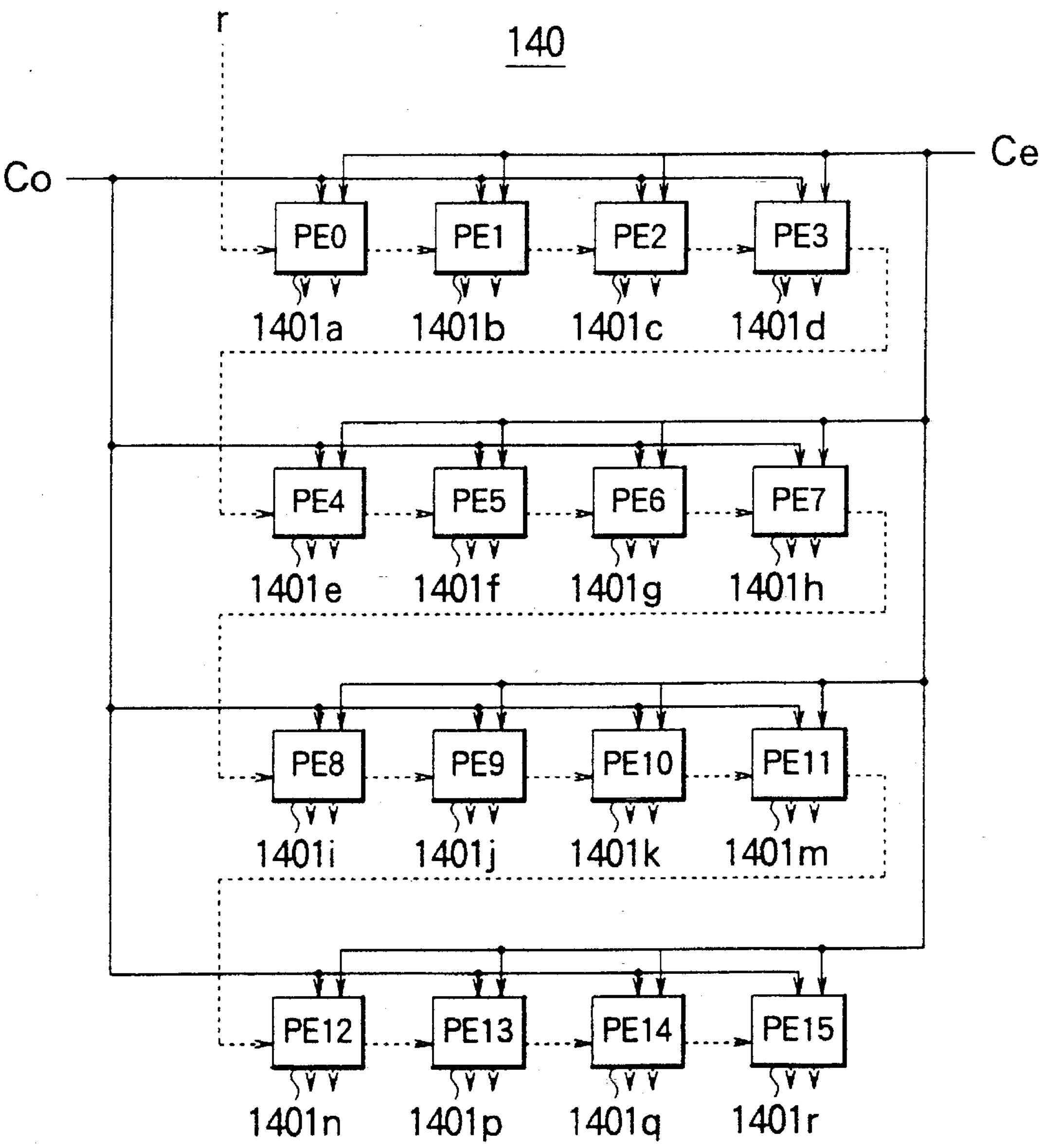
FIG. 24 is a view showing the configuration of a processing circuit according to a sixth embodiment of the present invention.

FIG. 24 is a view of the configuration of the processing circuit 140 of the sixth embodiment of the present invention.

The processing circuit 140 shown in FIG. 24 is a circuit resembling the processing circuit 120 shown in the fourth embodiment and like the processing circuit 120 is comprised of the processing units 1401*a* to 1401*r* arranged and connected in a 4×4 matrix. The processing units 1401*a* to 1401*r* separately output the sums of the absolute differences at the odd number field and even number field.

Figure 25A:
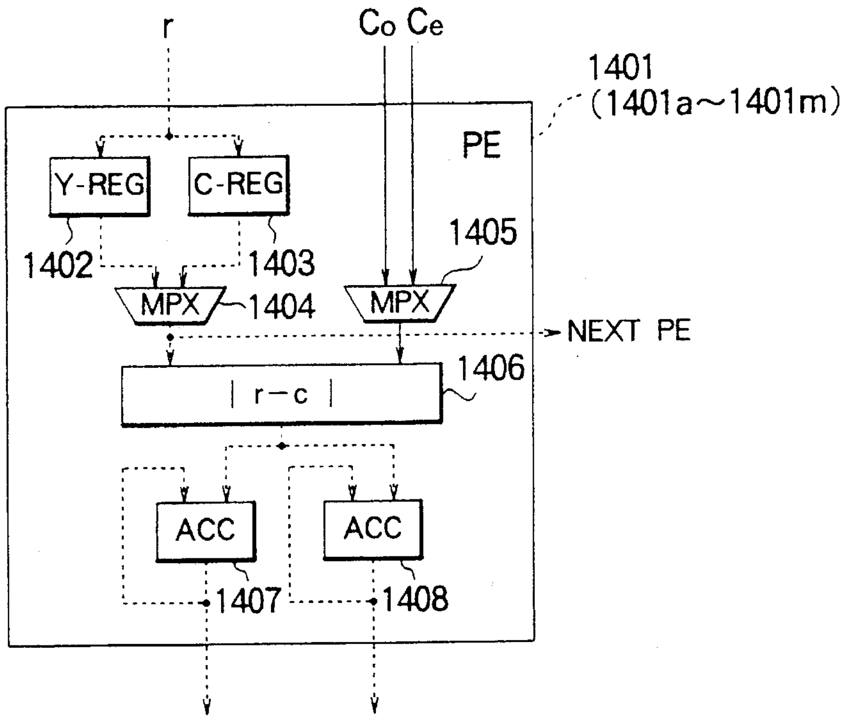
FIGS. 25A and 25B are views showing the configuration of the processing unit shown in FIG. 24.
Figure 25B:
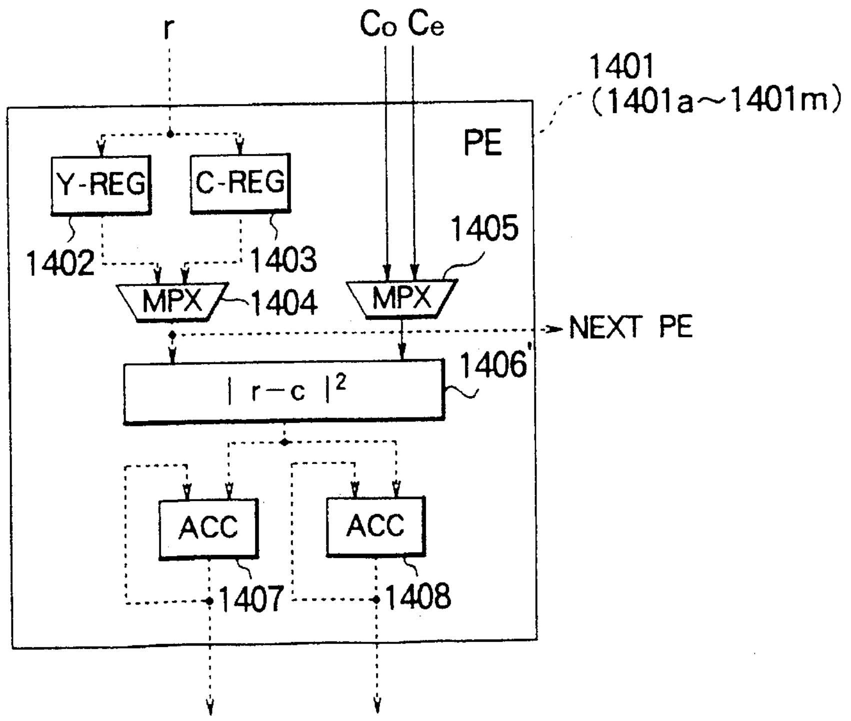

FIGS. 25A and 25B are views of configurations of a processing unit 1401.

The processing unit 1401 has a similar configuration to the processing unit 1201 explained with reference to the fourth embodiment. The components of the processing unit 1401 correspond to the components of the processing unit 1201 explained with reference to the fourth embodiment.

However, to separately calculate the sums of the absolute differences of the luminance signal Y and the chrominance signals $C_r$ and $C_b$, two components corresponding to the accumulator 1207 of the processing unit 1201 are provided, that is, the accumulators 1407 and 1408. The accumulators 1407 and 1408 accumulate the absolute differences of the even number field and the absolute differences of the odd number field calculated at the absolute difference processor 1406.

Below, an explanation will be made of the operation of the processing circuit 140.

The processing circuit 140, like the processing circuit 130 of the fifth embodiment, performs processing for calculation of the pixel data r and the pixel data c of the pixels of the reference block and candidate blocks shown in FIG. 22.

Figure 26:
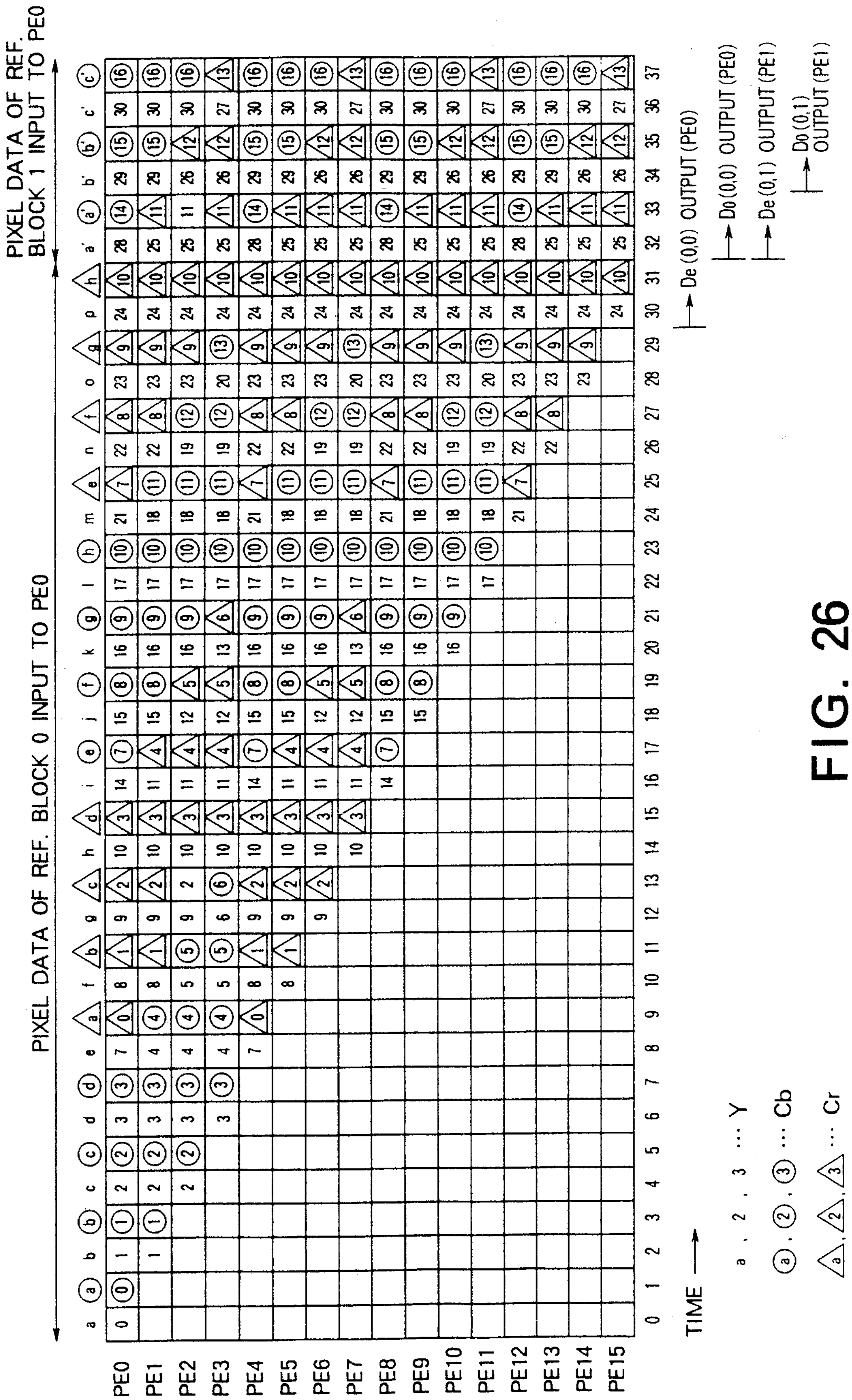
FIG. 26 is a view for explaining the pixel data processed by the processing units of the processing circuit shown in FIG. 24 and the timing of the same.

FIG. 26 is a view for explaining the pixel data processed by the processing units 1401*a* to 1401*r* of the processing circuit 140 shown in FIG. 24 and the timing of the same.

As shown in FIG. 26, the luminance signal Y and the chrominance signals $C_r$ and $C_b$ of the pixel data r of the reference block are stored in the luminance signal register 1402 and chrominance signal register 1403 of the processing unit 1401*a* every clock cycle.

Here, as explained earlier, the pixel data r are comprised of the luminance signal Y and the chrominance signals $C_r$ and $C_b$ alternately multiplexed.

All of the pixel data r corresponding to the pixels of the reference blocks are successively stored in the luminance signal registers 1402 and the chrominance signal registers 1403 of the processing units 1401*a* to 1401*r* over 32 clock cycles.

That is, the processing units 1401*a* to 1401*r* perform processing of the successively different pixel data r with each two clock cycles.

On the other hand, the pixel data c of the candidate blocks are input to the two input terminals of the multiplexers 1405 of the processing units 1401*a* to 1401*r* with the luminance signal Y and the chrominance signals $C_r$ and $C_b$ divided into two regions, the even number columns and odd number columns.

As explained in the fourth embodiment, when the multiplexer 1405 selects the even number columns and inputs the luminance signal Y of the pixel data c to the absolute difference processor 1406, the multiplexer 1404 selects the luminance signal register 1402 and inputs the luminance signal Y of the pixel data c to the absolute difference processor 1406.

Conversely, when the multiplexer 1405 selects the odd number columns and inputs the chrominance signals $C_r$ and $C_b$ of the pixel data c to the absolute difference processor 1406, the multiplexer 1404 selects the chrominance signal register 1403 and inputs the chrominance signals $C_r$ and $C_b$ of the pixel data c to the absolute difference processor 1406.

In this way, by controlling the multiplexers 1404 and 1405, the same types of elements of data of both the pixel data r and c are input in the absolute difference processor 1406.

In this way, the processing units 1401*a* to 1401*r* perform processing for calculation of at most two pixel data at a given clock cycle.

Note that even in the processing circuit 120 shown in the fourth embodiment, processing is possible depending on the order of input of the pixel data r and c shown in FIG. 26.

The absolute difference processor 1406 calculates the absolute differences of the input elements of data and inputs the same to the accumulators 1407 and 1408.

The accumulators 107 and 1408 accumulate the absolute differences corresponding to the even number field and the absolute differences corresponding to the odd number field among the output signals of the absolute difference processor 1406.

Due to the above processing, the sums of the absolute differences $D_o(i,j)$ at the even number field are successively output from the accumulators 1407 of the processing units 1401*a* to 1401*r* and the sums of the absolute differences $D_e(i,j)$ at the odd number field are successively output from the accumulators 1408 with each two clock cycles.

It is possible to compare the magnitudes (amplitudes) of the absolute differences of the odd number field and the even number field output from the processing units 1401*a* to 1401*r* and calculate two types of motion vectors at the odd number field and the even number field.

Further, in the same way as the processing circuit 130 shown in the fifth embodiment, by adding the absolute differences of the odd number field and the even number field and comparing their magnitudes, it is possible to calculate the motion vector for the frame.

In the embodiments explained above, the components of the processing circuits 110 to 140 may be comprised by hardware or comprised by software in a computer.

Further, the system can be optimized by comprising certain components by hardware and others by software.

In addition, the explanation was given with reference to a size of the reference block of 4×4 pixels and 4×4 number of candidate blocks, but the blocks may be of any number of pixels and of any shape so long as the number of pixels of the reference block and the number of the candidate blocks are made the same.

Also, the present invention can be applied to motion picture signals including color signals R, G, and B as the elements of data as well. In this case, similar processing by a circuit of the same configuration becomes possible by inputting the color signals R, G, and B instead of the luminance signal Y and the chrominance signals $C_b$ and $C_r$.

Further, the processing circuit of the present invention is not limited to compression and encoding of motion picture data and can be applied to compression and encoding of data comprised of a succession of data of the same type with some mutual correlation.

For example, the processing circuit of the present invention may be modified in various ways as exemplified by the modifications shown above.

As explained above, according to the processing circuit of the present invention, it is possible to calculate the sums of absolute differences of pixel data, necessary for processing for detection of a motion vector by the block-matching method, in motion picture encoding, based on a plurality of elements of data.

Accordingly, it is possible to detect a block with a strong resemblance in both the luminance signal component and the chrominance signal component, and it is possible to enhance the accuracy of detection of a motion vector.

Further, it is possible to apply the processing circuit of the present invention to detect a motion vector and compress and encode motion picture data subjected to motion compensation so as to thereby improve the efficiency of encoding.

Further, it is possible to prevent the occurrence of the reverse phenomenon of improvement of the efficiency of encoding by making the search range of the candidate blocks narrower.

What is claimed is:

1. An image signal processing circuit for:

detecting a motion vector by dividing each frame of an image signal into a plurality of blocks, each block comprising a predetermined number of pixels arranged in an array with rows and columns, wherein each pixel is associated with pixel data, and performing a search over all frames of said image signal by a block-matching method to compare a reference block of a current frame of said image signal with a number of candidate blocks of a previous frame of said image signal to detect the motion vector of said image signal, said processing circuit comprising:

a plurality of processing units, arranged in an array, for calculating evaluation values which are defined by the differences between pixel data of said reference block and pixel data of said candidate blocks;

a plurality of first adders connected in series with each other and connected to a first half of said processing units in said array of processing units to produce a sum of the outputs of said first half of said processing units;

a plurality of second adders connected in series with each other and connected to a second half of said processing units in said array of processing units to produce a sum of the outputs of said second half of said processing units;

a first pixel data supply unit from which said pixel data of said reference block are supplied to said processing units;

a second pixel data supply unit from which said pixel data associated with pixels in even numbered columns of pixels of said candidate blocks are supplied to said processing units; and a third pixel data supply unit from which said pixel data associated with pixels in odd numbered columns of pixels of said candidate blocks are supplied to said processing units, wherein said processing circuit simultaneously obtains three types of motion vectors, a motion vector derived from said pixel data associated with even numbered columns of pixels, a motion vector derived from said pixel data associated with odd numbered columns of pixels, and a motion vector derived from all said pixel data.

2. An image signal processing circuit as set forth in claim 1, wherein said processing units obtain the absolute differences between said pixel data of said reference block and said pixel data of said candidate blocks.

3. An image signal processing circuit as set forth in claim 1, wherein said processing units obtain the squared differences of said pixel data of said reference block and said pixel data of said candidate blocks.

4. An image signal processing circuit as set forth in claim 1, wherein said processing units are equal in number to said number of pixels in a block and are arranged in an array identical to said array of pixels.

5. An image signal processing circuit for:

detecting a motion vector by dividing each frame of an image signal into a plurality of blocks, each block comprising a predetermined number of pixels arranged in an array with rows and columns, wherein each pixel is associated with pixel data, and performing a search over all frames of said image signal by a block-matching method to compare a reference block of a current frame of said image signal with a number of candidate blocks of a previous frame of said image signal to detect the motion vector of said image signal, said processing circuit comprising:

a plurality of processing units, arranged in an array, for calculating evaluation values which are defined by the differences between pixel data of said reference block and pixel data of said candidate blocks, and for accumulating separately the evaluation values derived from pixel data associated with pixels in even numbered columns of said array of pixels and evaluation values derived from pixel data associated with pixels in odd numbered columns of said array of pixels to obtain the sums of the evaluation values;

a first pixel data supply unit from which said pixel data of said reference block are supplied to said processing units;

a second pixel data supply unit from which said pixel data associated with pixels in even numbered columns of pixels of said candidate blocks are supplied to said processing units; and a third pixel data supply unit from which said pixel data associated with pixels in odd numbered columns of pixels of said candidate blocks are supplied to said processing units;

wherein said processing circuit simultaneously obtains three types of motion vectors, a motion vector derived from said pixel data associated with even numbered columns of pixels, a motion vector derived from said pixel data associated with odd numbered columns of pixels, and a motion vector derived from all said pixel data.

6. An image signal processing circuit as set forth in claim 5, wherein said processing units obtain the absolute differences between said pixel data of said reference block and said pixel data of said candidate blocks and accumulate said absolute differences to calculate the sum of said absolute differences.

7. An image signal processing circuit as set forth in claim 5, wherein said processing units obtain the squared differences of said pixel data of said reference block and said pixel data of said candidate blocks and accumulate said squared differences to calculate the sum of said squared differences.

8. An image signal processing circuit for:

detecting a motion vector by dividing each frame of an image signal into a plurality of blocks, each block comprising a predetermined number of pixels arranged in an array with rows and columns, wherein each pixel is associated with pixel data, and performing a search over all frames of said image signal by a block-matching method to compare a reference block of a current frame of said image signal with a number of candidate blocks of a previous frame of said image signal to detect the motion vector of said image signal, said processing circuit comprising:

a plurality of processing units, arranged in an array, for calculating evaluation values which are defined by the differences of pixel data of a luminance signal component and a chrominance signal component of said reference block and pixel data of a luminance signal component and a chrominance signal component of said candidate blocks, and for accumulating said evaluation values to obtain the sum of said evaluation values;

a first pixel data supply unit from which said pixel data of said reference block are supplied to said processing units; and a second pixel data supply unit from which said pixel data of said candidate blocks are supplied to said processing units;

wherein said plurality of processing units being connected in a pipeline.

9. An image signal processing circuit as set forth in claim 8, wherein said processing units obtain the absolute differences between said pixel data of said reference block and said pixel data of said candidate blocks and accumulate said absolute differences to calculate the sum of said absolute differences.

10. An image signal processing circuit as set forth in claim 8, wherein said processing units obtain the squared differences of said pixel data of said reference block and said pixel data of said candidate blocks and accumulate said squared differences to calculate the sum of said squared differences.

11. An image signal processing circuit as set forth in claim 8, wherein said processing units are equal in number to said number of pixels in a block and are arranged in an array identical to said array of pixels.

12. An image signal processing unit as set forth in claim 8, wherein said processing units receive as input said pixel data of said candidate blocks divided into pixel data from even numbered columns of said pixel array and pixel data from odd numbered columns of said pixel array and said processing units each comprise:

a first multiplexer for multiplexing the divided pixel data;

a first register for storing said pixel data of the luminance signal component of said reference block;

a second register for storing said pixel data of the chrominance signal component of said reference block;

a second multiplexer for multiplexing said pixel data of the luminance signal component output from said first register and said pixel data of the chrominance signal component output from said second register;

an absolute difference processor for obtaining the absolute difference of the outputs of said first multiplexer and the second multiplexer; and an adding means for successively adding said absolute differences output from said absolute difference processor.

13. An image signal processing unit as set forth in claim 8, wherein said processing units receive as input said pixel data of said candidate blocks divided into pixel data from even numbered columns of said pixel array and pixel data from odd numbered columns of said pixel array and said processing units each comprise:

a first multiplexer for multiplexing the divided pixel data;

a first register for storing said pixel data of the luminance signal component of said reference block;

a second register for storing said pixel data of the chrominance signal component of said reference block;

a second multiplexer for multiplexing said pixel data of the luminance signal component output from said first register and said pixel data of the chrominance signal component output from said second register;

a squared difference processor for obtaining the squared difference of the outputs of said first multiplexer and the second multiplexer; and an adding means for successively adding said squared differences output from said squared difference processor.

14. An image signal processing unit as set forth in claim 8, wherein said processing units receive as input the pixel data of said candidate blocks divided into pixel data from even numbered columns of said pixel array and pixel data from odd numbered columns of said pixel array and said processing units each comprise:

a first multiplexer for multiplexing the divided pixel data;

a first register for storing said pixel data of the luminance signal component of said reference block;

a second register for storing said pixel data of the chrominance signal component of said reference block;

a second multiplexer for multiplexing said pixel data of the luminance signal component output from said first register and said pixel data of the chrominance signal component output from said second register;

an absolute difference processor for obtaining the absolute difference of the outputs of said first multiplexer and the second multiplexer; and an accumulator for successively accumulating said absolute differences output from said absolute difference processor.

15. An image signal processing unit as set forth in claim 8, wherein said processing units receive as input the pixel data of said candidate blocks divided into pixel data from even numbered columns of said pixel array and pixel data from odd numbered columns of said pixel array and said processing units each comprise:

a first multiplexer for multiplexing the divided pixel data;

a first register for storing said pixel data of the luminance signal component of said reference block;

a second register for storing said pixel data of the chrominance signal component of said reference block;

a second multiplexer for multiplexing said pixel data of the luminance signal component output from said first register and said pixel data of the chrominance signal component output from said second register;

a squared difference processor for obtaining the squared difference of the outputs of said first multiplexer and said second multiplexer; and an accumulator for successively accumulating said squared differences output from said absolute difference processor.

* * * * *